United States Patent
Glover et al.

(10) Patent No.: US 9,443,352 B1
(45) Date of Patent: Sep. 13, 2016

(54) NAVIGATING THROUGH A VIRTUAL ENVIRONMENT HAVING A REAL-WORLD ELEVATION CHARACTERISTICS USING MOTION CAPTURE

(71) Applicants: Robert Michael Glover, Marietta, GA (US); Arris Eugene Ray, Kennesaw, GA (US); DJ Jonathan Cassel, Acworth, GA (US); Nels Howard Madsen, Auburn, AL (US); Thomas Michael McLaughlin, Miramar Beach, FL (US)

(72) Inventors: Robert Michael Glover, Marietta, GA (US); Arris Eugene Ray, Kennesaw, GA (US); DJ Jonathan Cassel, Acworth, GA (US); Nels Howard Madsen, Auburn, AL (US); Thomas Michael McLaughlin, Miramar Beach, FL (US)

(73) Assignee: Motion Reality, Inc., Marietta, GA (US)

( * ) Notice: Subject to any disclaimer, the term of this patent is extended or adjusted under 35 U.S.C. 154(b) by 399 days.

(21) Appl. No.: 14/136,781

(22) Filed: Dec. 20, 2013

Related U.S. Application Data

(60) Provisional application No. 61/745,339, filed on Dec. 21, 2012.

(51) Int. Cl.
  *G06T 15/06* (2011.01)
  *G06T 19/00* (2011.01)
  *G06T 15/08* (2011.01)

(52) U.S. Cl.
  CPC ............ *G06T 19/003* (2013.01); *G06T 15/06* (2013.01); *G06T 15/08* (2013.01)

(58) Field of Classification Search
  CPC ..... G06T 13/40; G06T 13/00; G06T 15/506; G06T 15/50; G06T 15/80; A63F 13/10
  See application file for complete search history.

(56) References Cited

U.S. PATENT DOCUMENTS

| | | | | |
|---|---|---|---|---|
| 5,990,896 A | * | 11/1999 | Barrus | G06T 15/10 345/420 |
| 2002/0089506 A1 | * | 7/2002 | Templeman | G06F 3/012 345/473 |
| 2006/0262120 A1 | * | 11/2006 | Rosenberg | G06F 3/011 345/473 |
| 2012/0209563 A1 | * | 8/2012 | Takeda | A63F 13/06 702/159 |

* cited by examiner

*Primary Examiner* — James A Thompson
*Assistant Examiner* — Tapas Mazumder
(74) *Attorney, Agent, or Firm* — King & Spalding

(57) ABSTRACT

A computer generates one or more geometric rays at a predetermined height above one or more portions of an avatar's body in a virtual environment. Once the rays are generated, the computer computes intersections of the one or more rays with a collision mesh that defines a terrain of the virtual environment at the location of the avatar. Then, the computer computes the point of intersection of each of the one or more rays with the collision mesh. Using the points of intersection, the computer calculates an offset in an elevation and/or an offset in an orientation of the avatar with respect to the terrain in the virtual environment. Further, the computer adjusts the elevation and/or the orientation of the avatar based on the calculated offset in the elevation and/or the elevation in the orientation, respectively, such that the adjusted elevation and/or orientation compensates for the calculated offsets.

37 Claims, 18 Drawing Sheets

NAVIGATING THROUGH A VIRTUAL ENVIRONMENT HAVING A REAL-WORLD ELEVATION CHARACTERISTICS USING MOTION CAPTURE

CROSS REFERENCE TO RELATED APPLICATIONS

This application claims priority to U.S. Provisional Patent Application No. 61/745,339 filed Dec. 21, 2012 in the name of Robert Michael Glover, Nels Howard Madsen, Thomas Michael McLaughlin, Arris Eugene Ray, D J Jonathan Cassel, Timothy Lee Petty, Ryan Matthew Kirby, Robert Kyle Turner and Jason Albert Hipkins and entitled "Navigating in a Virtual World that has Normal Real-World Elevation Characteristics," the entire contents of which are hereby incorporated herein by reference.

FIELD OF INVENTION

This disclosure relates generally to a technical field of simulation systems and, in one example embodiment, to a system, method and an apparatus for navigating in a virtual environment having real-world elevation characteristics using motion capture.

BACKGROUND

Training in realistic situations often yields substantial performance improvement. However, such realistic training can pose a high risk to participants, especially if the training involves potentially dangerous tasks or operations in hostile and/or potentially threatening environments. So, to provide participants with reduced risk environments for training, the realistic situations can be simulated using motion capture, where the term 'motion capture,' refers generally to capturing any appropriate motion of an object (animate or inanimate) in the real-world using appropriate sensors and translating the motion in the real-world to a motion of a computer-generated model (herein interchangeably referred to as 'avatar') of the object in a virtual environment.

In the motion capture simulation, the real-world environment may include a physical volume that has a level or flat surface while the virtual environment may include real-world elevation characteristics that includes but not limited to, undulating terrain, natural or man-made inclines, steps, roof-tops, ditches, spans, and so on. Conventional technology provides a one to one translation of participants in the real-world to their corresponding avatar in the virtual environment which may not take into consideration the real-world elevation characteristics in the virtual environment. Accordingly, an ability to navigate a virtual environment that has real-world elevation characteristics while participants move in a flat or level surface in the real-world may be restrained. For example, if the avatar of the participant has to walk over a hill in the virtual world, a one on one translation of the motion of the participant in the real-world along a level and flat surface may result in abnormalities such as the legs of the corresponding avatar being buried under the hill or floating above the hill. Such abnormalities may increase a suspension of disbelief barrier that may cause a realism of the simulation to be compromised. Further, such abnormalities may reduce a training effectiveness of the participant and the participant may become frustrated.

Conventional technology addresses the above mentioned limitations by providing props in the real-world that resemble the real-world elevation characteristics in the virtual environment. In other words, solutions offered by conventional technology would require a real-world volume to be designed to have features that resemble the elevation characteristics of the virtual environment. For example, if there is a car in the virtual environment, the physical volume in which the participants are located should be designed to include a platform that resembles a car. Such designing of physical volumes have features (e.g., props, platforms, etc.) that resemble one or more of the elevation characteristics in the virtual environment characteristics would be cost prohibitive and time consuming. Other solutions to address the above-mentioned limitations include simplifying the design of the virtual environment to consist of only level or flat surfaces. In other words, the virtual environment is simplified to remove all surface variations or spatial elevation characteristics. Such redesigning of the virtual environment severely restricts the type of virtual environment environments available for the participants to train. In view of the foregoing discussion of representative shortcomings, need for improved mapping from the real-world to the virtual environment having real-world elevation characteristics that addresses the above-mentioned shortcomings is apparent.

SUMMARY

The present invention can address the needs described above by providing methods for navigating a participant's avatar through a virtual environment having real-world elevation characteristics while the counterpart participant in the capture volume moves or performs various actions along a substantially level or flat ground surface of the capture volume.

In one example aspect of the present invention, a method can include mapping a person from the capture volume in the physical world to the virtual environment using appropriate transformation matrices. The person is represented by an avatar in the virtual environment. Once, the person is mapped into the virtual environment, the method can include determining an offset in an elevation and/or an offset in an orientation of the avatar in the virtual environment. The offset is measured with respect to a terrain (stairs, floor, hole, car, etc.) of the virtual environment at a location of the avatar and the terrain is defined by a collision mesh.

To determine the offset in the elevation and/or the offset in the orientation, the method can include generating one or more geometric rays at a one or more portions of the avatar's body in the virtual environment. The origin of the geometric rays are at a predetermined height above the portion of the avatar's body at which the geometric rays are generated, and a direction of the geometric rays are downwards towards to the terrain that is defined by the collision mesh. Once the geometric rays are generated, the method can include computing an intersection of the geometric rays with the collision mesh and determining the point of intersection of each geometric ray with the collision mesh. The offset in the elevation and/or the orientation of the person is then determined based on the points of intersection of each geometric ray with the collision mesh.

Once the offset in the elevation and/or the offset in the orientation is determined, the method can include adjusting an elevation and/or an orientation of the avatar based on the offset in the elevation and/or the offset in the orientation, respectively. Further, the method can include adjusting a view of the virtual environment based on the adjusted elevation and/or orientation of the avatar and displaying the adjusted view of the virtual environment to the person in the capture volume.

BRIEF DESCRIPTION OF THE DRAWINGS

Example embodiments are illustrated by way of example and not limitation in the figures of accompanying drawings, in which.

Figure 1:
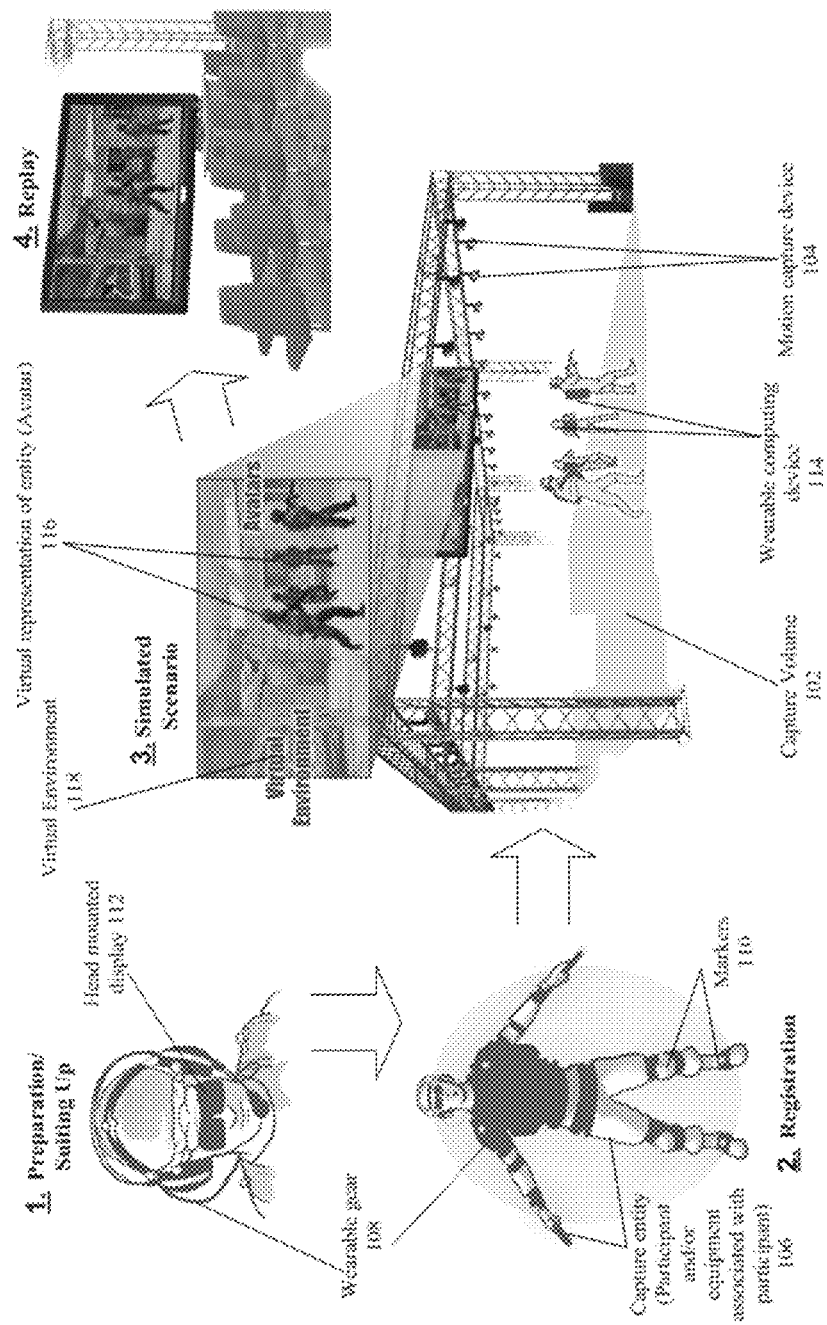
FIG. 1 illustrates an exemplary operational environment for sensory immersive motion capture simulation, according to certain exemplary embodiments of the present invention.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensions may be exaggerated to help visually convey such principles. In the drawings, reference numerals designate like or corresponding, but not necessarily identical, elements throughout the several views. Other features of the present embodiments will be apparent from the Detailed Description that follows.

DETAILED DESCRIPTION OF THE DRAWINGS

Disclosed are a system, a method and an apparatus for navigating through a virtual environment having real-world elevation characteristics using motion capture. Before discussing the embodiments directed to the method and system for navigating through a virtual environment having real-world elevation characteristics, it may assist the reader to understand the various terms used herein by way of a general description of the terms in the following paragraphs.

The term 'capture volume' as used herein generally refers to a physical volume of space that may or may not be confined by a boundary. Further, in one example, the capture volume may have substantially level or flat ground surface on which a user may perform any appropriate actions such as walk, crawl, jump, run, and so on. Even though a capture volume having a substantially flat or level surface is discussed herein, one of ordinary skill in the art can understand and appreciate that the capture volume can be set up to include any other variations or props as desired. In addition, the capture volume may be under surveillance of one or more devices that can capture any appropriate motion. In one example, a capture volume may be contiguous or in multiple parts that are remote from one another and linked through networking technology.

The term 'virtual environment' as used herein generally refers to an environment generated, produced, created, or rendered by one or more computer systems for computer based simulations. The virtual environment can include any conceivable and designable real-world characteristic. For example, the virtual environment may include real-world elevation characteristics such as undulating terrains, natural or man-made inclines, steps, roof-tops, ditches, spans, and so on as discussed earlier. In some embodiments, the virtual environment and the capture volume can be mapped one to one. In other embodiments, the virtual environment may be intended to include a region much larger than the capture volume. For example, the capture volume may be a 100×50 foot space, whereas the virtual environment may be the size of a large city. The virtual environment may be designed such that a user within the confines of the capture volume can feel a sense of immersion in the much larger virtual environment. A listing of other examples of virtual environment without being exhaustive can include desert environments, rain forest environments, urban environments, war zones, hospitals, fire stations, multi-story buildings, an aerial views of a world, or any other conceivable and designable environment in which a participant can be immersed through motion capture.

The term 'participant' as used herein generally refers to any appropriate animate object. For example, the participant may be a person, an animal, and so on. In one example, the participant can wield or operate a weapon or other inanimate objects. In addition to the participant, the inanimate objects can also be motion captured using appropriate motion capture devices.

The term 'avatar' as used herein generally refers to representation of the participant in the virtual environment that is computer generated and whose actions are driven by the behavior and/or actions of the participant in the capture volume. The avatar can have a living human counterpart that is active during the simulation. In some embodiments, the term 'avatar' can refer to a representation of an inanimate object in the virtual environment that is computer generated and driven by the inanimate object in the capture volume. For example, a vehicle or a weapon in the capture volume may have a corresponding avatar in the virtual environment by way of motion capture of the vehicle or weapon in the capture volume.

The term 'offset in an elevation and an orientation of an avatar,' as used herein may refer to an amount by which an avatar of a participant is out of line in terms of the avatars elevation and orientation with respect to a terrain and/or object in the virtual environment at the location of the avatar. For example, when a participant (person) in the capture volume is mapped to the virtual environment using a one to one transformation that does not take into account the elevation characteristics of the virtual environment, the position of the participant's avatar may be offset in his/her elevation which may cause him to appear floating above the ground in the virtual environment, buried under the ground, and so on. In another example, the avatar of the participant may be oriented along a 180 degree horizontal plane while the ground surface in the virtual environment is at a 40 degree incline. In particular, an offset in an elevation may refer to an offset along a y-axis and an offset in the orientation may refer to an offset along an axis of rotation. Even though an offset in terms of elevation and offset is discussed herein, one of ordinary skill in the art can understand and appreciate that the offset may include a variation along any of the x, y, and z axes.

The term 'ray(s),' as used herein may refer to geometric and/or mathematical rays generated by one or more computers. The rays may be virtual rays that are generated in the virtual environment to assist with appropriate calculations in a motion capture simulation operation which may be discussed below in greater detail in association with FIGS. 6-15. Typically, the rays may be invisible, however, in one example, the rays can be made visible to a participant, an operator, or any other external user if desired. Further, any calculations using the rays may be mathematical. For example, intersecting the ray with a plane in the virtual environment may be a mathematical and logical process rather than a physically intersection of the rays with the plane.

The term 'collision mesh,' as used herein may generally refer to a polygon mesh that is a collection of vertices, edges and faces that approximates a geometric domain. The polygon mesh may be a 2-dimensional or 3-dimensional mesh. The faces as described above may typically include triangles, quadrilaterals or other simple convex polygons, but may also be composed of more complex polygons, general concave polygons, or polygons with holes. Herein the collision mesh may be referred to as 'alternate geometric mesh'. The alternate geometric mesh as described herein may define a terrain of a simplified version of the virtual environment that is rendered for visuals and/or any appropriate objects in the virtual environment.

The alternate geometric mesh may allow a subject to navigate more smoothly through areas or over objects in the virtual environment 118 whose elevation changes may be busy or choppy. Typically, the geometric mesh utilized to intersect with the rays is the same as the underlying geometrical mesh used to render the visuals. However, as described above, in some cases the underlying geometrical mesh used for the visuals may be too busy or choppy to allow the participant 106 to smoothly navigate the object or area of interest. An example of this could be a vehicle in the virtual environment 118. In said example, trying to move through the vehicle without 'accidentally' standing on the seats, dashboards, etc., could be difficult for the participant 106 given the close quarters in which the participant 106 has to maneuver and also the fact that there is no tactile feedback (or a corresponding prop resembling the vehicle in the physical volume). To mitigate these areas the system 100 allows for the use of alternate geometrical meshes (e.g., alternate geometric mesh 804) to be used for the purpose of offset calculations and adjustment of the elevation and orientation of the participant's avatar 116. These alternate geometrical meshes can be designed to model the desired elevation changes for the participant 106 to navigate. The mesh is referred to as 'alternate' because it is different from the version of geometric mesh that is used to render visuals of the virtual world to the participants and is used for calculation of the elevation and/or orientation offsets. The alternate geometric mesh may interchangeably be referred to as collision mesh herein.

To further assist the reader in understanding the method, system, and apparatus for navigating in a virtual environment having real-world elevation characteristics using motion capture, a brief description of a motion capture system is provided in the following paragraphs.

A motion capture simulation system enables participants in a capture volume to be immersed in a three-dimensional virtual reality environment (interchangeably referred to as "virtual world") where each participant is represented by their respective virtual representation (hereinafter "avatars"). The motion of the participants in the capture volume can be captured using one or more motion capture devices, such as imaging sensors, motion capture cameras, and so on. The motion data (herein 'motion capture data') corresponding to the motion of the participants that is captured using the one or more motion capture devices can be used to drive the participants' respective avatars in the virtual world. In other words, the motion capture data can be used to characterize with high fidelity the movements and actions of the participants, which are immediately and accurately, translated into corresponding movements and actions of the participants' avatars in the virtual world. The participants immersed in the virtual environment can interact with each other, virtual props in the environment and virtual characters via their respective avatars. In addition, the participants can take part in various activities in the virtual environment such as group training, combat training, team building, or any other appropriate individual or team activities.

In addition to avatars of the participants, the virtual world may include virtual characters or objects that are computer generated and controlled using artificial intelligence algorithms to interact with other virtual characters, avatars, or objects. In one example, the virtual characters may not have human counterparts that drive the virtual characters, rather, the virtual characters may be driven independent of human counterparts and by artificial intelligence algorithms as discussed above. In other words, a virtual character is one that does not have a living human counterpart that is active in the simulation during the simulation. Hereinafter, the term virtual character may be interchangeably referred to as an AI character without departing from a broader scope of this description.

The motion capture simulation system can provide a sensory immersive experience to the participant by providing various sensory feedback signals to the participants. The sensory feedback signal provided to the participants can be adapted to the perspective, orientation and configuration of the respective participant's avatar. The various sensory feedback signals can include visual, audio, tactile and olfactory feedback and they can be generated based on the motion capture data and other physiological data from the participants in the motion capture simulation system. In particular, the motion capture data of a participant can be used to model, inter alia, a visual field of view and a surround sound audio effect as perceived by the participant's avatar in the virtual environment. The modeled field of view and the surround sound audio effect may be transferred to the participant in the motion capture simulation system as visual and audio feedback respectively, to provide the participant with a sensory immersion experience into the virtual environment.

The participants can receive the various sensory feedback signals using a wearable computing device donned by each of the participants. The wearable computing device can be adapted to receive the feedback signals, process it when needed and transfer the feedback signal to the participant through adapted feedback communication devices.

In one embodiment, the feedback communication devices can be attached to the participant. For example, a muscle stimulation sensor may be attached to the participant to receive a tactile feedback signal. In another embodiment, the feedback communication devices can be disposed in the capture volume having the participants. For example, surround sound speakers may be disposed in the capture volume. In one example embodiment, the visual feedback can be provided as a first person stereoscopic point of view (POV) display to a participant using a head mounted display device (HMD). In another example embodiment, the audio feedback can be provided as a surround sound effect customized to the perspective of the participant's avatar through a pair of headphones.

Now proceeding to describe the method, apparatus, and system for navigation in a virtual world having real-world elevation characteristics using motion capture, the following paragraphs provide an introduction to an exemplary system for navigation in the virtual world having real-world elevation characteristics.

An exemplary system for navigating a virtual world having real-world elevation characteristics using motion capture includes a capture volume having a substantially flat or level ground surface on which a participant (herein 'person') is disposed. A motion of the participant in the capture volume is captured using one or more motion capture devices included in the capture volume and is translated by a simulation engine into a movement of an avatar of the participant (herein "participant's avatar") in a virtual world. Even though the motion of the participant in the capture volume is along a flat ground surface, a corresponding movement of the participant's avatar in the virtual world may not be along a flat terrain because the virtual world may have real-world elevation characteristics such as undulating terrains, natural or man-made inclines, steps, roof-tops, ditches, and so on. To compensate for such real-world elevation characteristics, a simulation engine maps the participant from the capture volume to the virtual environment using a one to one transformations and then determines if there is an offset in an elevation and/or an offset in orientation of the participant's avatar with respect to the terrain of the virtual environment.

To determine the offset in an elevation and/or the orientation (herein "elevation offset" and "orientation offset") of the participant's avatar, one or more geometric rays are generated in the virtual environment at one or more portions of a body of the participant's avatar (herein "avatar's body"). The placement of the geometric rays may be based on an action of the participant in the capture volume. For example, if the participant in the capture volume is walking, then the geometric rays are generated at each foot of the participant's avatar, whereas if the participant is crawling in the capture volume, the geometric rays may be generated at the head, the waist (also referred to as "midriff portion"), and the feet of the participant's avatar.

The geometric rays are generated such that a point of origin of each ray is at a predetermined height above a portion of the avatar's body to allow the avatar to navigate over real-world elevations in the virtual environment while walking straight along the flat ground surface in physical world without having to raise the participant's foot in physical volume as if the participant is walking on a surface having elevation variations in the physical volume. For example, a ray may be generated at a foot of the avatar with the origin of the ray being at a height of the avatar's knee. If the origin of the ray starts at foot, then as the participant is walking across the physical volume, the subject will have to raise his foot as if the participant were stepping upon the steps when there are no actual steps in the physical volume. The origination of ray at a predetermined height above the portion of the avatar's body allows the subject to walk straight in the physical volume while climbing any object in the virtual world that is less than or equal to the predetermined height of the origin of the rays. Further, setting the origin of the rays at a predetermined height restricts the avatar from interacting or climbing anything that is more than the predetermined height in the virtual world with which the participant's avatar isn't supposed to interact. To climb anything that is above the predetermined height of the origin of the ray, the participant will have to raise his foot in the physical volume.

Further, the direction of the geometric rays are substantially perpendicular to the terrain or ground of the virtual environment at a location of the participant's avatar. In other words, the geometric rays are directed vertically downwards from their point of origin.

Once the geometric rays are generated, the rays are intersected with an alternate geometric mesh that defines a simplified version of a terrain and/or an object in the virtual environment at a location of the participant's avatar. One of ordinary skill in the art can understand and appreciate that the intersection of the geometric rays with the alternate geometric mesh is a mathematical operation.

Once the geometric rays are intersected with the alternate geometric mesh, the points of intersection of the geometric rays with the alternate geometric mesh and the length of the geometric rays from the point of origins of the geometric rays to their respective points of intersection with the alternate geometric mesh is determined and used to calculate the elevation offset and/or the orientation offset of the participant's avatar in the virtual environment.

Then, using the elevation offset and/or the orientation offset of the participant's avatar, the simulation engine determines an updated elevation and/or orientation of the participant's avatar. Further, the simulation engine modifies a transformation of the participant's motion data by which the participant is mapped from the capture volume to the virtual environment to reflect the updated elevation and/or the updated orientation of the participant's avatar. In other words, the simulation engine adjusts the elevation and/or orientation of the participant's avatar in the virtual environment to compensate for the elevation offset and/or the orientation offsets and to align the participant's avatar with the terrain of the virtual environment at a location of the participant's avatar. The elevation and/or orientation of the participant's avatar may be updated on a continuous basis i.e., as a participant moves in the virtual environment via the participant's avatar, calculation are made to determine the elevation and/or orientation of the ground below the avatars feet and update the avatar's elevation and/or orientation accordingly. In some embodiments, the calculation of the updated elevation and/or orientation of the participant's avatar in the virtual environment can be disabled and enabled by the simulation engine as desired.

Once the elevation and/or orientation of the participant's avatar is adjusted, a view of the virtual environment as perceived by the participant's avatar is changed to reflect the change in elevation and/or orientation of the participant's avatar. In other words, once the elevation and/or orientation of the participant's avatar is adjusted, the simulation engine displays, to the participant via the participant's HMD, a view of the virtual environment from the updated elevation and orientation of the avatar in the virtual environment.

Technology for navigation in a virtual environment having real-world elevation characteristics using motion capture will now be described in greater detail with reference to FIGS. 1-15, which describe representative embodiments of the present invention. FIGS. 1, 2, 3, 4 and 5 describe a representative motion capture simulation system, as an exemplary embodiment of a motion capture simulation environment. FIGS. 6-11 describe methods for navigating in a virtual environment having elevation characteristics under different example scenarios of walking, crawling, jumping, and falling using suitable illustrations and flowcharts.

The present invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting and among others supported by representations of the present invention.

Moving now to discuss the figures further, an exemplary embodiment of the present invention will be described in detail. First, FIGS. 1-5 will be discussed in the context of describing a representative operating environment suitable for practicing certain embodiments of the present invention. FIGS. 6-15 will be discussed, making exemplary reference back to FIGS. 1-5 as may be appropriate or helpful.

As further discussed below and in accordance with certain embodiments of the present invention, FIG. 1 illustrates an exemplary system that is useful for motion capture simulation, while FIGS. 2, 3, 4, and 5 illustrate exemplary system elements.

Referring now to FIG. 1, this figure illustrates an exemplary motion capture simulation system 100, according to certain exemplary embodiments of the present invention. In particular, FIG. 1 illustrates a capture volume 102, a motion capture device 104, a capture entity 106, a wearable gear 108, makers 110 coupled to the wearable gear 108, a head mounted display device (hereinafter "HMD" device) 112, a wearable computing device 114, a virtual environment 118, and an avatar 116.

A motion capture simulation system 100 (hereinafter "motion capture system") can include a capture volume 102 where a number of capture entities 106 (e.g., participants) can participate together in a simulated scenario in a virtual environment 118. In one example embodiment, the capture volume 102 as discussed herein may have a substantially level or flat surface (ground or floor) on which the capture entities 106, such as participants are disposed. In other words, in said example embodiment, the capture volume 102 may not include any props, raised platforms, or inclined platforms to assist the participants to navigate in the virtual environment having real-world elevation characteristics. While the capture volume has a substantially flat or level ground surface, the virtual environment may have real-world elevation characteristics as described earlier. Even though the following description focuses on capture volumes having flat or level ground surfaces, one of ordinary skill in the art can understand and appreciate that if needed the capture volume can be equipped with any appropriate props as desired.

As described earlier, the capture entity 106 as illustrated in FIG. 1 can be any object in the capture volume 102 that is motion captured into the simulated virtual environment 118 using a motion capture device 104. In one example embodiment, the capture entity 106 can be a living being (participant), such as a human being. In another example embodiment, the capture entity 106 can be any physical inanimate object (weapon, weapon model, racket, wand, stick, etc.) in the capture volume 102. In some embodiments, the capture entity 106 can be both a participant and equipment associated with the participant, such as a weapon held by a participant.

In one embodiment, a motion capture device 104 in the capture volume 102 can capture (quantitatively assess) the movement and/or actions of the capture entity 106 and process it to generate corresponding motion capture data. Alternatively, a tracking system 408 may process the movement and/or action of the capture entity obtained from the motion capture device 102 to generate the motion capture data. In one embodiment, when the capture entity 106 is a participant, the motion capture data can include, inter alia, a position along an x-y-z axes, an orientation along the axes of rotation, and/or a velocity of movement of the participant. When the capture entity 106 includes ammunition and/or a model of the ammunition, the motion capture data can include, inter alia, a position, an orientation and/or a velocity of movement of the ammunition and/or a model of the ammunition. In another embodiment, the motion capture data can include a position, an orientation, and velocity of movement of both the participant and the object associated with the participant.

The motion capture data of the capture entity 106, along with other capture entity-specific information such as sound and physiological data, can be used by the motion capture system 100 to control the behaviors and/or interactions of participant avatars in the simulated virtual environment 118. Further, such data from the capture entity 106 can be used by an artificial intelligence algorithm of the motion capture system 100 to control a reaction of virtual characters. It should be noted that an action of the virtual character is not controlled by the action of the participant in the capture volume, rather, a reaction of the virtual character is affected by the action of the participant in the capture volume 102. For example, when the participant raises his gun for aiming the participant's avatar does the same in the virtual world. In said example, if the avatar is pointing the gun at a virtual character, the virtual character may get defensive as controlled by the artificial intelligence algorithm (e.g., point a gun back at the avatar, run in zigzags, hide, and so on). The action of the virtual character may be controlled by an artificial intelligence algorithm.

Operation 1 as shown in FIG. 1, illustrates a capture entity 106 (hereinafter 'participant') preparing to participate in a simulation scenario in the virtual environment 118. In one embodiment, to participate in such a simulation, a capture entity 106 such as a participant (e.g., living being) can don a wearable computing device 114. The peripherals of the wearable computing device 114 can include, but are not limited to the HMD 112, a microphone, a set of headphones and/or a computing device capable of transmitting, receiving and/or processing data. Further, the participant can be outfitted with a wearable gear (e.g., clothing, equipment, etc). In one embodiment, retro reflective markers 110 and/or other items for tracking the participant's movement in the capture volume 102 may be attached to the wearable gear. In some embodiments, the motion capture system 100 can track the participants even without any markers.

In operation 2, after appropriate preparation (e.g., suiting up), the participant 106 can register with the motion capture system 100. The operation of registering can include creating an avatar for the participant 106 in the virtual environment 118. Further registering as a participant 106 can include establishing an association between the participant's wearable computing device 114 and the participant's avatar 116. After being registered, the participant 106 is now free to join other participants 106 in the simulated scenario. While in the capture volume 102, the motion capture system 100 can determine the position and actions (e.g., motion data) of the participant 106.

In Operation 3, the motion capture system 100 can integrate the participant 106 into the virtual environment 118 by driving the behavior and/or actions of the participant's avatar in the virtual environment 118 using the motion capture data of the respective participant 106. Further, the participant's avatar's view of the simulated virtual environment can be nearly simultaneously displayed in the participant's HMD 112. Once the participant 106 is integrated into the virtual environment 118 through his avatar 116, the participant 106 can explore the virtual environment 118 and/or participate in the simulated events in the virtual environment 118. In one embodiment, upon completion of the simulation scenario, the simulation can be optionally replayed for training or other purposes, as illustrated by operation 4 of FIG. 1. The motion capture system 100 is described in greater detail below, in association with FIG. 2.

Figure 2:
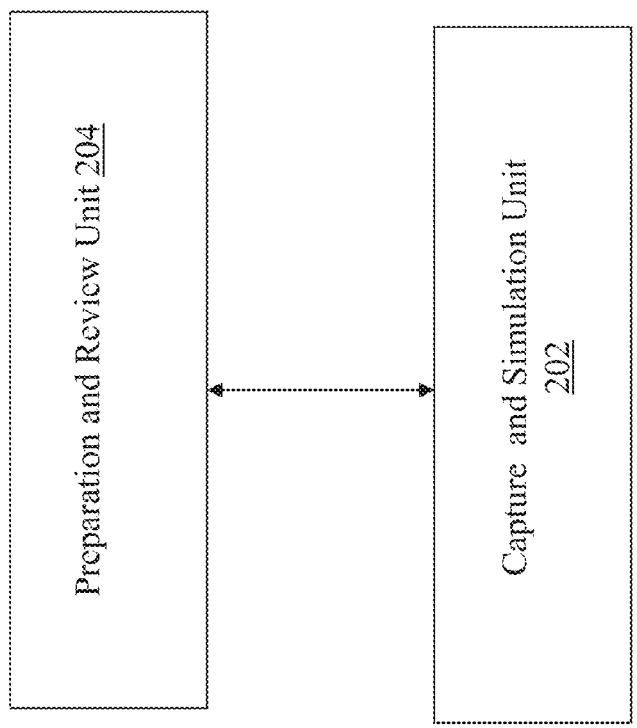
FIG. 2 illustrates a block diagram of a sensory immersive motion capture simulation system, according to certain exemplary embodiments of the present invention.

Referring now to FIG. 1 and FIG. 2, FIG. 2 illustrates a functional block diagram of the motion capture simulation system of FIG. 1, according to certain exemplary embodiments of the present invention. In particular, FIG. 2 illustrates a capture and simulation unit 202 and a preparation and review unit 204.

The capture and simulation unit 202 can be operable to obtain motion capture data associated with participants 106 disposed in the capture volume 102. The motion capture data can be obtained by capturing images and/or video recording the capture volume 102 in which the participants are disposed. The images and/or recordings of the capture volume 102 including the participants can be processed by the capture and simulation unit 202 to extract the motion capture data associated with the participants. Further, the capture and simulation unit 202 can use the motion capture data of each of the participants to drive the avatars of each participant in the virtual environment 118. One of ordinary skill in the art will understand and appreciate that even through capturing images and/or video recording the capture volume are specifically mentioned to obtain the motion capture data, they can be replaced with other tracking modalities without departing from the broader spirit of the invention.

In addition, the capture and simulation unit 202 can be operable to generate sensory feedback signals based on motion capture data and interactions of participants' avatars in the virtual environment 118. Further, the capture and simulation unit can transmit the feedback signals to the participants in the capture volume, creating a feedback loop. The feedback loop created by the participant's interaction with the data processed and emanating from the capture and simulation unit 202 provides an immediate and tactile experience drawing the participant into a belief that the experience is real (immersion). In one embodiment, the capture and simulation unit 202, can also generate and manage actions of AI characters in the virtual environment 118 using artificial intelligence algorithms.

The virtual environment 118 and the simulation scenarios can be generated and managed by the preparation and review unit 204. Further, the preparation and review unit 204 can be operable to prepare participants for taking part in the simulation scenario as described in operations 1-4 of FIG. 1. For example, the preparation and review unit can be operable to, inter alia, register the participant with the motion capture system 100, associate a participant to a corresponding avatar 116 in the virtual environment 118, associate the participant's wearable computing device 114 to the participant's avatar 116, scale the participant's avatar to match a physical dimension of the participant in the capture volume 102, and so on. Further, the preparation and review unit 204 can store the avatar of each participant and can provide the information that associates the participant to the avatar to the capture and simulation unit 202 for further processing. Accordingly, the capture and simulation unit 202 can be communicatively coupled to the preparation and review unit 204. In addition to providing information that associates the participant to the avatar, the preparation and review unit 204 can be operable to load a virtual environment 118 and/or a simulated scenario in the virtual environment 118 when requested by the capture and simulation unit 202. The capture and simulation unit 202 and the preparation and review unit 204 are described in greater detail below, in association with FIG. 3 and FIG. 4.

Figure 3:
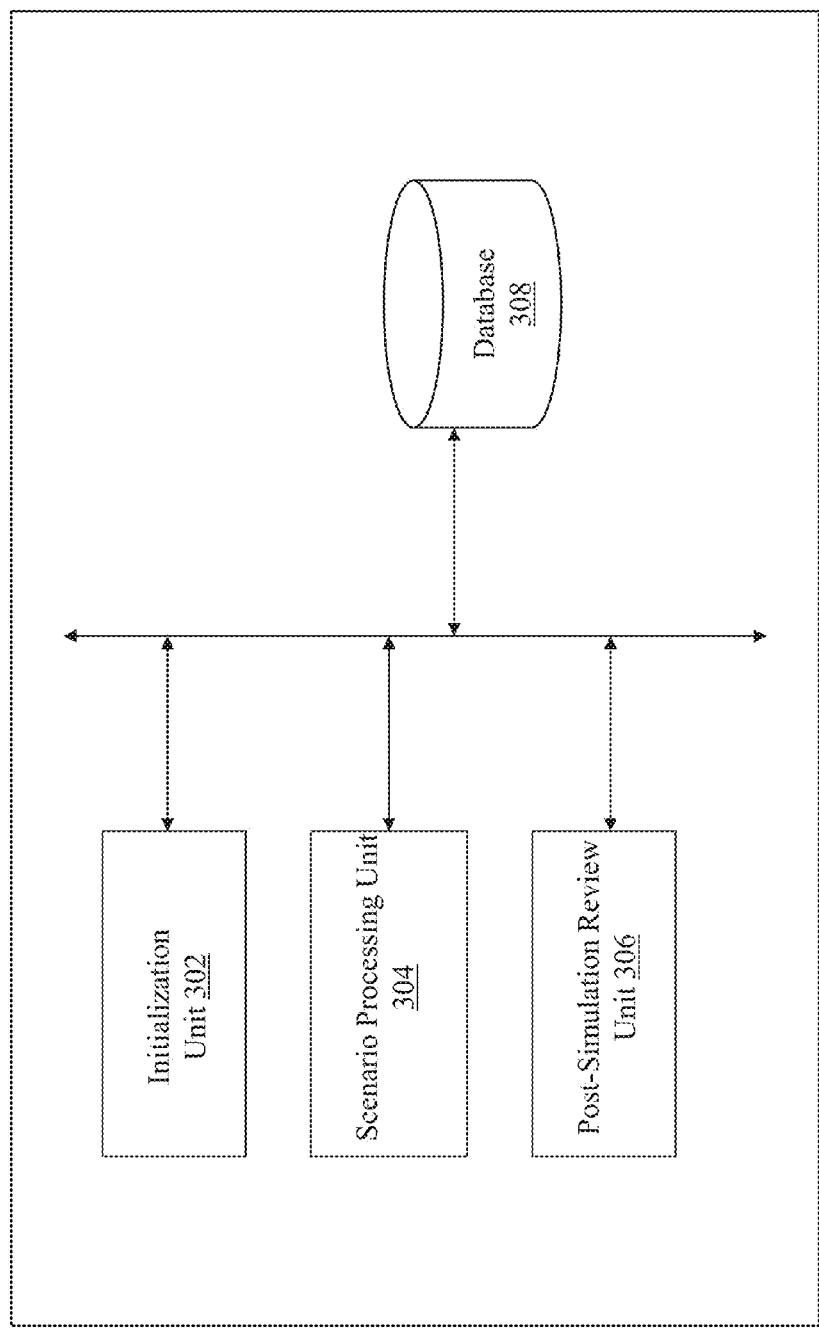
FIG. 3 illustrates a block diagram of a preparation and review unit of the sensory immersive motion capture simulation system, according to certain exemplary embodiments of the present invention.

Now referring to FIG. 2 and FIG. 3, FIG. 3 illustrates a functional block diagram of the preparation and review unit of FIG. 2, according to certain exemplary embodiments of the present invention. In particular, FIG. 3 illustrates an initialization unit 302, a scenario processing unit 304, a post simulation review unit 306 and a database 308.

The preparation and review unit 204 can include an initialization unit 302 that can be operable to prepare participants for taking part in the simulation scenario. To prepare the participants for the simulation, the initialization unit 302 can personalize the participant to the motion capture system 100 by first, associating the participant (wearing the wearable gear and/or the wearable computing device 114) with an avatar having the physical dimensions of an average sized human being. The physical dimensions of the average size human being can be predefined. Once the participant is associated with the avatar, the initialization unit 302 can scale the participant's avatar to approximately match the physical dimensions of the participant using position of the markers attached to the wearable gear donned by the participant. Then, the initialization unit 302 can store the relevant participant data, avatar data, scaling data and/or association data between the participant and the avatar in the database 308.

Further, the preparation of review unit 204 can include the scenario processing unit 304. The scenario processing unit 304 can include a data processing device capable of connecting to a distributed network (e.g., Internet). The scenario processing unit 304 can facilitate an operator (not shown in Figure) loading or modifying a virtual environment upon a request from the capture and simulation unit 202. Accordingly, the scenario processing unit 304 may provide a user interface that allows a user to design a virtual environment and modify the virtual environment as desired either while the simulation is running, before the simulation starts, and/or after the simulation ends. Further, the scenario processing unit 304 can be configured to import a virtual environment from an online source. Alternatively, the scenario processing unit 304 can import scenarios and store them in the database 308.

In the exemplary embodiment of FIG. 3, the processing and review unit 204 can further include the post simulation review unit 306. The post simulation review unit 306 can include a data processing device such as a computer, a display device and/or and audio output device. In one embodiment, the capture and simulation unit 202 can store the recorded simulation scenario in the database 308. The operator can play the recorded simulation scenario for post simulation training and/or other purposes. The capture and simulation unit 202 is described in greater detail below, in association with FIG. 4.

Figure 4:
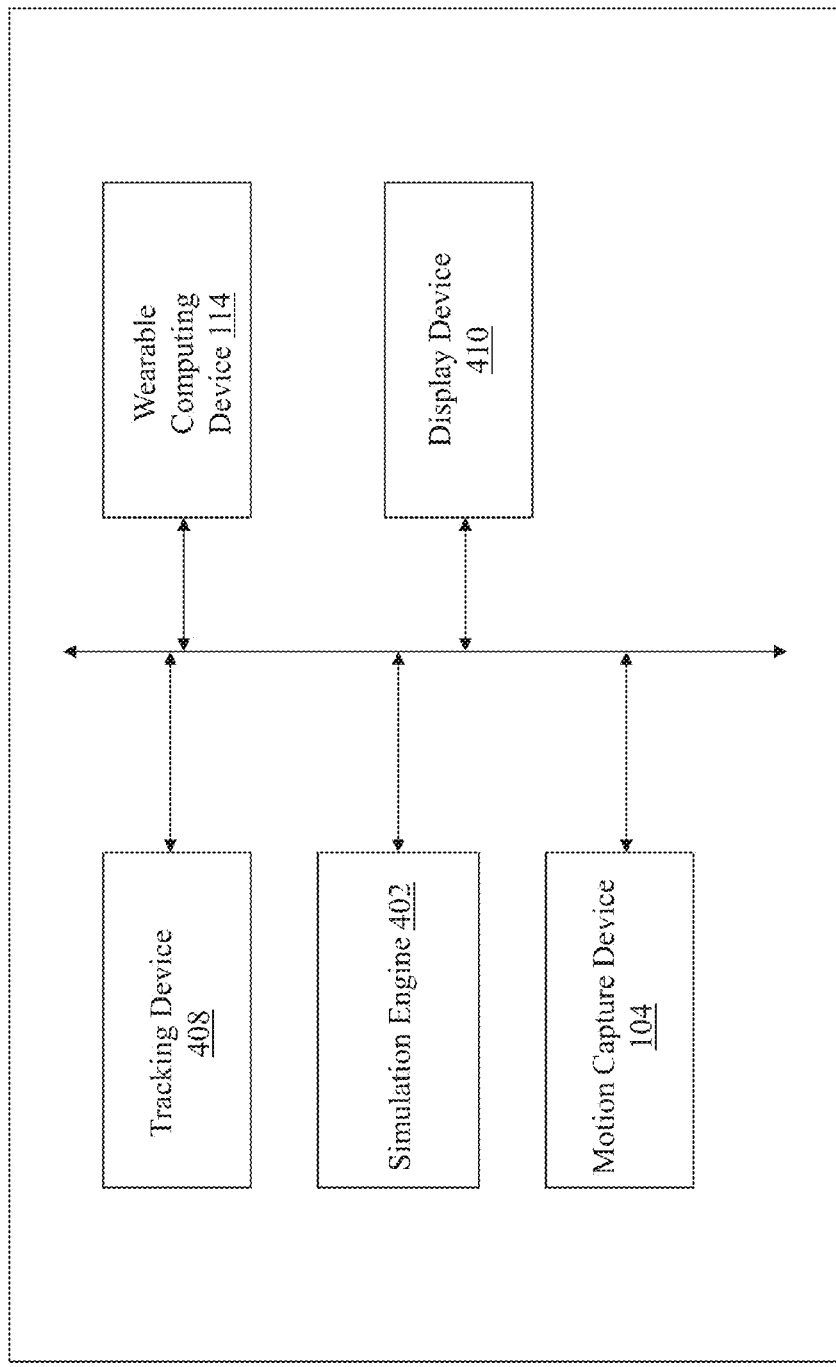
FIG. 4 illustrates a block diagram of a capture and simulation unit of the sensory immersive motion capture simulation system, according to certain exemplary embodiments of the present invention.

Now referring to FIG. 2 and FIG. 4, FIG. 4 illustrates a functional block diagram of the capture and simulation unit of FIG. 2, according to certain exemplary embodiments of the present invention. In particular, FIG. 4 illustrates a tracking system 408, a simulation engine 402, a motion capture device 104, a wearable computing device 114, and/or a viewer device 410.

The capture volume 102 can be under surveillance of the simulation engine 402 using a motion capture device 104. The motion capture device 104 can include a high speed camera that supports support high-speed image capture, as well as high-speed image processing and is operable to collect information about the locations of the markers (or the location of the subject in a markerless embodiment) as the participant 106 moves. The information collected by the motion capture device 104 can include images and/or video of the capture volume 102 and a participant 106 within the capture volume 102. In some embodiments, the motion capture system 100 can include more than one motion capture device. Each motion capture device 104 of the one or more motion capture devices may be connected to each other, as well as to a tracking system 408.

The information captured using the motion capture device 104 can be forwarded to the tracking system 408. The tracking system 408 can use the captured information from the motion capture device 104 to track and determine a motion of the participant 106 in the capture volume 102. Further, using the captured information, the tracking system 408 can determine 3D motion data (hereinafter "motion capture data") for each participant 106 in the capture volume. In one embodiment, the tracking system 408 can send the motion capture data (e.g., position, orientation, velocity, etc.) of the participant 106 to the wearable computing device 114 of the participant 106 and/or to the simulation engine 402.

As described above, the simulation engine 402 can receive motion capture data from the tracking system 408. In some cases, the simulation engine 402 may receive the motion capture data directly from the motion capture device 104. In addition to the motion capture data, the simulation engine 402 can receive auditory, tactile data, and/or olfactory data. The simulation engine 402 can process the received data (sensory data and/or the motion capture data) to generate sensory feedback signals for the capture entity 106 (e.g., participant) and to drive the participants' avatars in the virtual environment 118. Further, the simulation engine 402 can determine an elevation offset and/or orientation offset of the participants' avatars in the virtual environment 118. The determination of the offsets and adjustment of the avatars to compensate for the offsets will be described in greater detail further below in association with FIGS. 5-15.

The simulation engine 402 can transmit the feedback signals, as auditory data, visual data, tactile data and/or olfactory data, to the wearable computing device 114 of the capture entity 106. In addition to transmitting the feedback signals to the wearable computing device, the simulation engine 402 can transmit a simulation scenario to a display device 410. The display device 410 can process the video data and/or the simulation scenario to display the simulation to an external user. The display device 410 can include, inter alia a TV, a computer, a monitor, a LCD display, LED display and/or smart display. The display device 410 can display the simulation from different perspectives. The different perspectives may be displayed through a partitioned view over a single display interface such that an external user need not use multiple display devices to view the simulation from each perspective. In an alternate embodiment, the display device can include one or more display interfaces that are connected to each other. The simulation engine 402 will be described in greater detail below in association with FIG. 5.

Figure 5:
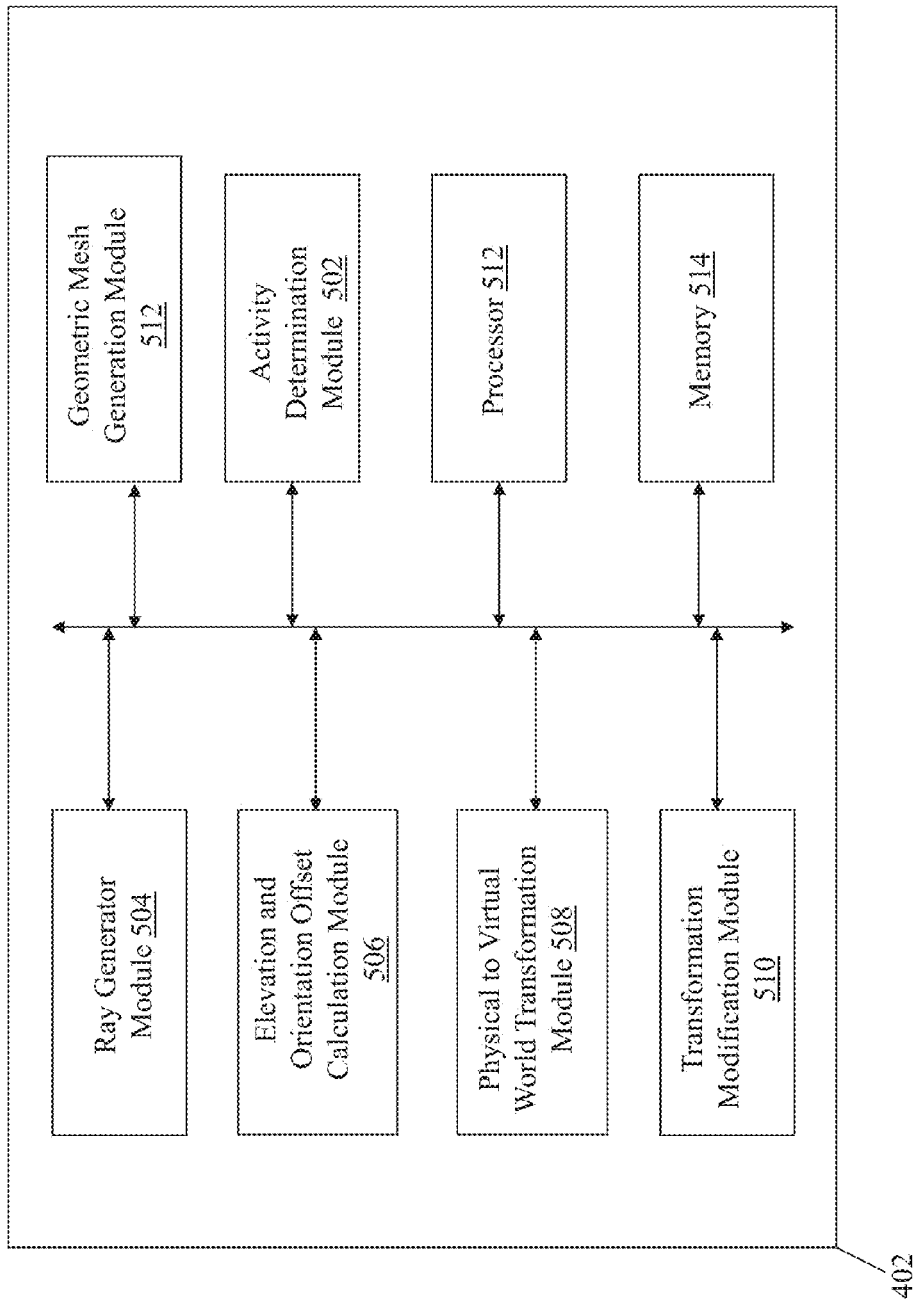
FIG. 5 illustrates a block diagram of a simulation engine of the capture and simulation unit, according to certain exemplary embodiments of the present invention.

Now referring to FIG. 4 and FIG. 5, FIG. 5 illustrates a functional block diagram of the simulation engine, according to certain exemplary embodiments of the present invention. In particular, FIG. 5 illustrates an activity determination module 502, a ray generator module 504, an elevation and orientation offset calculation module 506, a physical to virtual world transformation module 508, a transformation modification module 510, a processor 512, and a memory 514.

The simulation engine 402 can be configured as a centralized system or a distributed system using one or more data processing devices such as computers mounted on a rack or computers distributed at remote locations and communicatively connected via a network.

In one embodiment, the simulation engine 402 can include a processor 512 that may be a multi-core processor and/or a combination of multiple single core processors. Further, the simulation engine 402 may include a memory 514 that is coupled to the processor 512. The memory 514 may be non-transitory storage medium or a transitory storage medium that may include instructions that when executed by the processor 512 may perform operations of the simulation engine 402. In other words, operations associated with the different modules 502-512 of the simulation engine 402 can be executed using the processor 512.

In an example embodiment, the simulation engine 402 can include an activity determination module 502. The activity determination module 502 can determine an action of the participant 106 in the capture volume 102 based on a motion capture data of the participant 106. In one example embodiment, to determine an activity performed by the participant 106 in the capture volume, the activity determination module 502 may determine a placement and position of one or more body parts of the participant 106 in the capture volume 102. For example, the activity determination module may process the motion capture data corresponding to the participant 106 and determine that both feet of the participant are on the ground in the capture volume. Further, in said example, the activity determination module may determine that the head of the participant is at a threshold height above the ground in the capture volume. From the determination of the position of the feet and the head the activity determination module 502 may determine that the participant 106 is performing an activity that requires the participant 106 to be standing on his feet, such as walking, stooping, running, squatting, or so on. In another example, the activity determination module 502 may determine that the participant 502 is in a prone position or crawling in the capture volume 102 if the head, waist, and feet of the participant 106 are less than a threshold distance above the ground and/or a vertical distance between the head and the waist is less than a threshold distance. The process of determining an activity of a participant in a capture volume will be described below in greater detail in association with FIGS. 11 and 14.

Once the activity of the participant 106 in the capture volume 102 is determined, the corresponding data related to participant's activity may be relayed to the elevation and orientation offset calculation module 506 (herein 'offset module'). Further, the participant's motion capture data may be forwarded to the physical to virtual world transformation module 508 (herein 'transformation module').

Upon receiving the motion capture data, the transformation module 508 can process the motion capture data to transform the coordinates that represent the participant 106 in the capture volume 102 to co-ordinates that position and/or place the participant in the virtual environment 118 via the participant's avatar 116. In other words, the transformation module 508 can map the participant 106 from the capture volume 102 to the virtual environment 118. The mapping may be done using transformation matrices. In particular, the position and orientation of a participant 106 in the capture volume 102 can be transformed to the motion-capture Cartesian coordinate frame using a first transformation matrix. Once the participant's local frame is transformed to the Cartesian coordinate frame, a second transformation matrix can be applied to map the participant 106 from the Cartesian coordinate system into a virtual environment 118 coordinate system. In an example embodiment, the second transformation matrix can contain any appropriate arbitrary translation and rotation about any or all of the 3 axes, depending on a desired operational position and orientation in the virtual environment. In other words, the participant's avatar 116 can be moved throughout the virtual environment 118 based on the movement of the participant 106 in the capture volume 102 (which in turn modifies the first transformation matrix) and by also manipulating the second transformation matrix (translation and rotation matrix).

After mapping the participant 106 from the capture volume 102 to the virtual environment 118, the transformation module 508 may communicate with the offset module 506 to determine an elevation offset and/or an orientation offset of the participant's avatar which in turn may communicate with the ray generator module 504 (herein 'ray module'). Together, the ray module 504 and the offset module 508 may operate in concert to determine an offset in an elevation and/or orientation of the avatar 116 in the virtual environment 118.

Specifically, the ray generator module 504 can generate one or more geometric rays at one or more portions of the avatar's body based on an activity of the participant 106 in the capture volume as determined by the activity determination module 502. For example, if the participant 106 is in a prone position, the ray module 504 may generate three rays in the virtual environment 118, one at the avatar's head, one at the avatar's waist, and one at the avatar's feet. In another example, if the participant 106 is walking, the ray module may generate two rays in the virtual environment 118, one at each foot of the participant's avatar 116. In particular, the origin of the rays may be at a predetermined height above a position of the portion of the avatar's body and the rays may be directed vertically downwards towards the terrain (ground) of the virtual environment. In one embodiment, the predetermined height at which each ray originates may be same for all the rays that are generated by the ray module 504 or alternatively, the predetermined height may be different for each ray. In another embodiment, the predetermined height of origin may remain the same for some rays while different for the other rays. For example, if a ray is generated at a left foot of the participant's avatar whose origin is 10 inches above the position of the avatars left foot, another ray generated at a right foot of the participant's avatar may either be 10 inches above the position of the avatar's right foot or may be any other desired height above the position of the avatar's right foot.

Once the rays are generated, the offset module 506 can communicate with the geometric mesh generation module 512 (herein 'mesh module') to retrieve an alternate geometric mesh with which the generated rays can be intersected. The mesh module 506 is configured to generate the alternate geometric mesh prior to run time and store it in the memory 514, as necessary. As described earlier, the alternate geometric mesh defines a simplified version of the virtual environment that is rendered to the participant.

Once the rays are generated and the appropriate geometric mesh is obtained, the offset module 506 can intersect the rays with the alternate geometric mesh and determine points of intersection of each ray with the alternate geometric mesh. Further, the offset module 506 can determine the length of the ray from the point of origin of the ray to a point of intersection of the ray with the alternate geometric mesh. The length of the ray may represent a distance of the portion of the avatar's body from the terrain (ground surface) of the virtual environment. Using the length of each ray and points of intersection of each ray with the alternate geometric mesh, the offset module 506 can calculate an elevation offset and/or an orientation offset of the avatar 116 in the virtual environment 118. In other words, the elevation offset of one or more portions of the avatar's body from the terrain of the virtual environment may be processed to generate a final elevation offset and/or orientation offset of the participant's avatar. For example, an average of the one or more points of intersection with the alternate geometric mesh (herein interchangeably referred to as 'collision points') of one or more portions of the avatars body may be computed to determine a final or updated elevation offset of the participant's avatar. In another example, if the collision point of the ray from the left foot of the participants avatar with the alternate geometric mesh indicates a y-coordinate value of 10 and the collision point of the right foot of the of participant's avatar indicates a y-coordinate value of 0 then, the final elevation of the participant's avatar may be set based on collision point of the left foot, the collision point of the right foot, or an average of the collision point values of both feet of the participant's avatar. Once the respective offsets are determined, the offset module 506 may forward the computed elevation and/or orientation offset to the transformation modification module 510 (herein 'modification module').

Upon receiving the elevation and/or the orientation offsets, the modification module 510 can modify a transformation or mapping of the participant 106 from the capture volume 102 to the virtual environment 118 to compensate for the elevation and/or orientation offsets. In an example embodiment, the elevation offset may be an offset along a y-axis and the orientation offset may be an offset along an axes of rotation. Accordingly, a position of the participant's avatar 116 may be adjusted along a y-axis to compensate for the elevation offset and the orientation of the participant's avatar may be adjusted along an axis of rotation to compensate for the orientation offset. For example if the elevation offset is 30 inches, then an elevation of the participant's avatar may be adjusted +/−30 units along the y-axis in the virtual environment, provided each unit along the y-axis represents an inch. In particular, the values of the second transformation matrix i.e., the translation and rotational transformation matrix described above in association with the transformation module 508 may be adjusted to account for the elevation and/or orientation offset to map the participant 106 from the Cartesian coordinate system into a virtual environment 118 coordinate system. In other words, the modification module 510 may compute an updated elevation and orientation for the participant's avatar 116 based on the elevation and orientation offset.

Once the elevation and the orientation of the participant's avatar 116 is adjusted by modifying a transformation of the motion capture data that maps the participant 106 from the capture volume 102 to the virtual environment 118, the simulation engine 402 can adjust a view of the virtual environment 116 based on the adjusted elevation and orientation of the participant's avatar. Further, the adjusted view of the virtual environment 118 may be displayed to the participant 106 in the capture volume 102 through the participant's HMD 112.

Now turning to FIGS. 6-15, these figures describe the method of navigating through a virtual environment having real world elevation characteristics while the participant in capture volume moves along a flat or level surface. First, FIGS. 6-8 describe a method that provide an overview of how a participant's avatar is moved through a virtual environment having real world elevation characteristics while the participant in capture volume moves along a flat or level ground surface. Then, the remaining FIGS. 9-15 describe methods for navigating through a virtual environment having real world elevation characteristics for specific actions such as walking, crawling, jumping, and so on.

Figure 6:
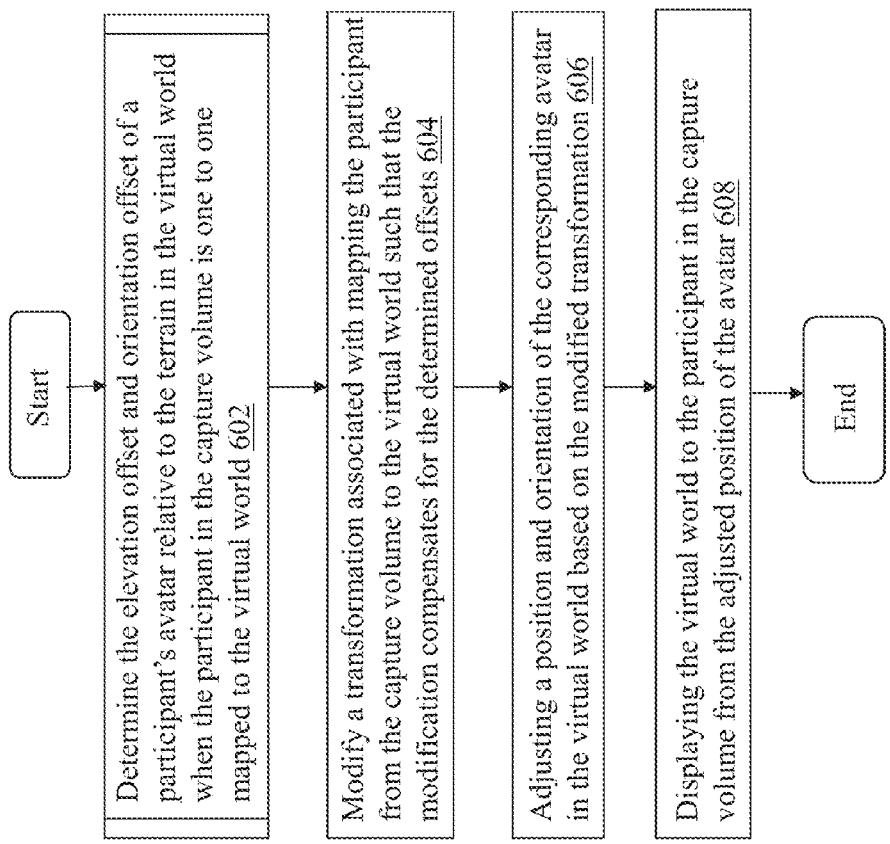
FIG. 6 is a flowchart that illustrates a process of navigating in a virtual environment having elevation characteristics while in a flat elevation capture volume, according to certain exemplary embodiments of the present invention.
Figure 7:
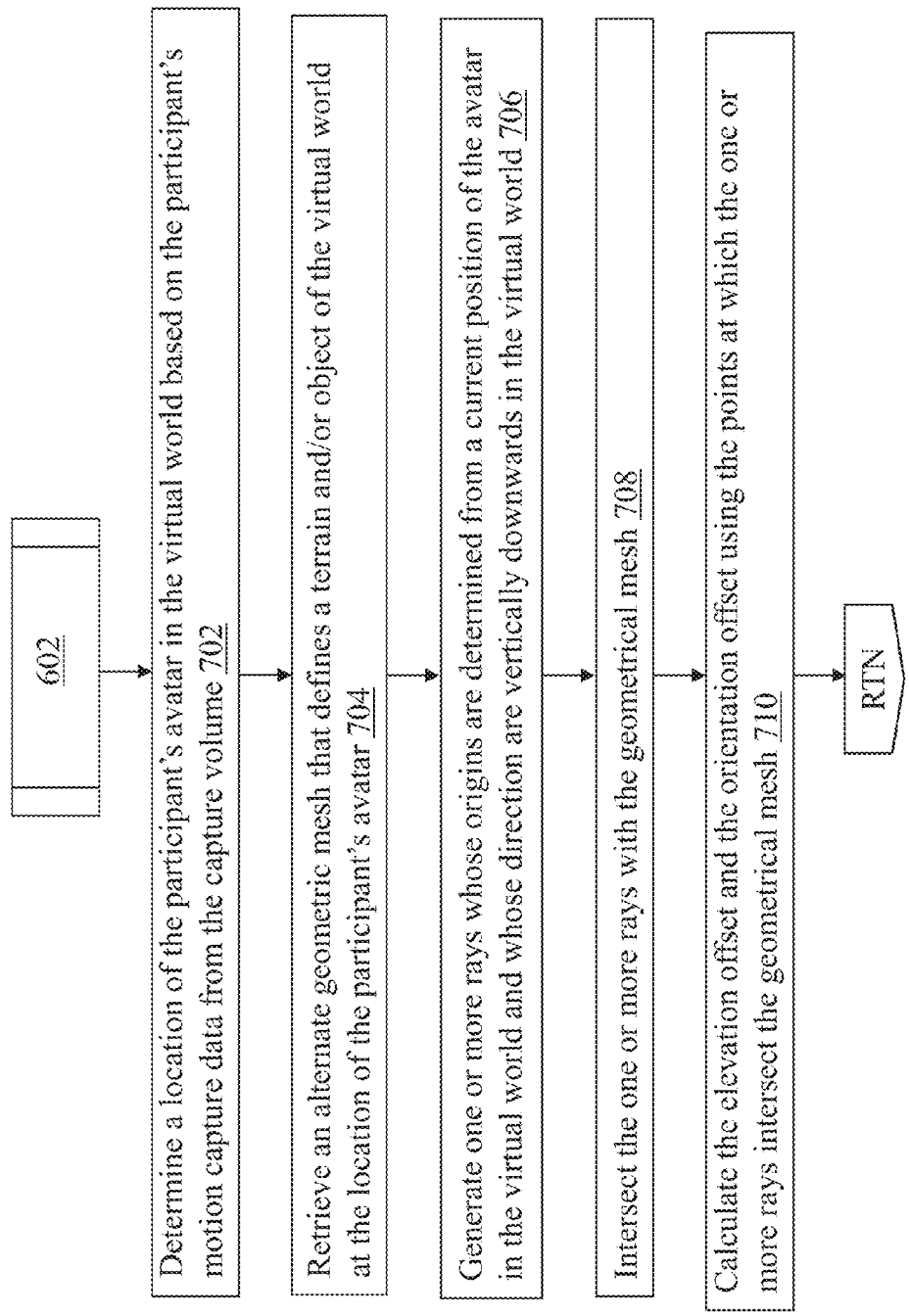
FIG. 7 is a flowchart that illustrates a process of determining elevation and orientation offsets in the virtual environment that has elevation characteristics, according to certain exemplary embodiments of the present invention.
Figure 8:
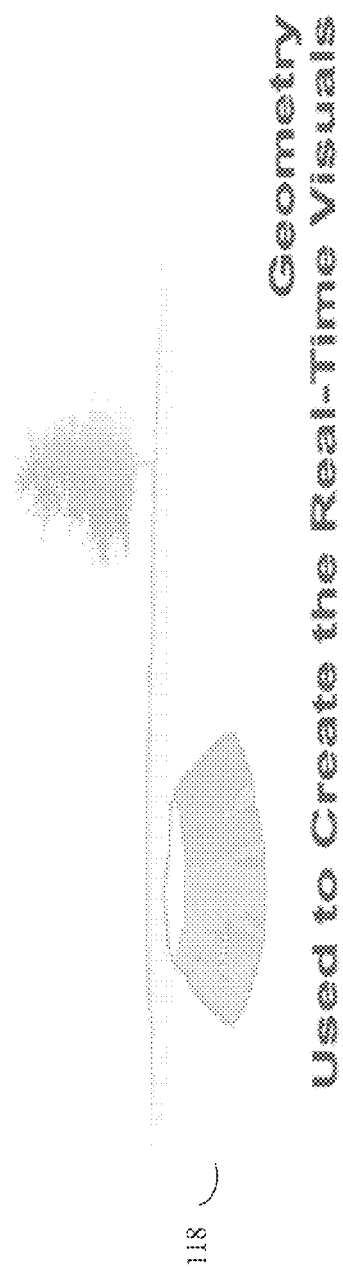
FIG. 8 illustrates an exemplary graphical representation corresponding to the process of determining elevation and orientation offsets in the virtual environment, according to certain exemplary embodiments of the present invention.
Figure 8:
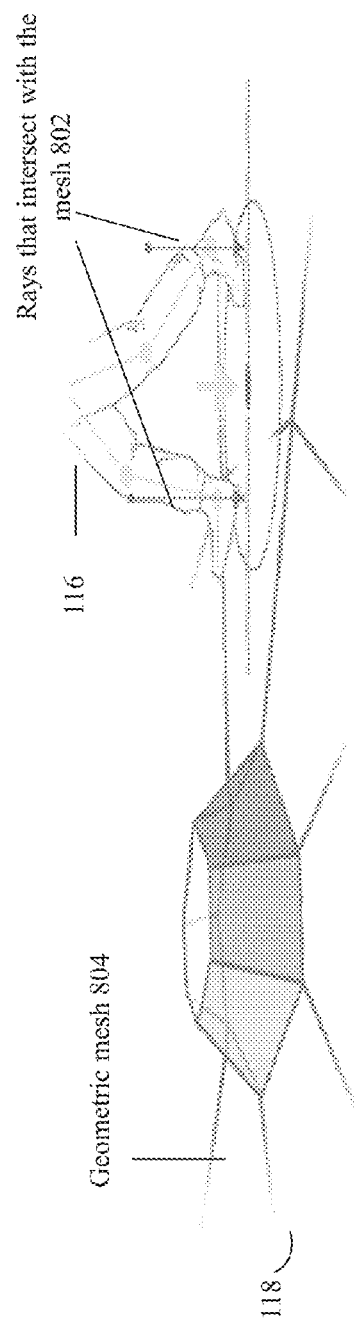

Turning to FIGS. 6-8, FIG. 6 is a flowchart that illustrates a process of navigating in a virtual environment having elevation characteristics while a participant is in a flat elevation capture volume, according to certain exemplary embodiments of the present invention. The process of FIG. 6 starts and proceeds to operation 602. In operation 602, the simulation engine determines an elevation offset and/or an orientation offset of a participant's avatar in the virtual environment 118 that results from a one to one mapping of the participant 106 from the capture volume 102 to the virtual environment 118. Even though the description mentions only an elevation and orientation offset, one of ordinary skill in the art can understand and appreciate that any other offset along any other appropriate axes can be determined and compensated for without departing from a broader scope of the description. Operation 602 will be explained in further detail below, in association with FIG. 7 in combination with the illustrations of FIG. 8.

Turning to FIG. 7, this figure is a flowchart that illustrates a process of determining elevation and/or orientation offsets in the virtual environment that has elevation characteristics, according to certain exemplary embodiments of the present invention. The process begins with operation 702 where the simulation engine 402 determines a location of the participant's avatar in the virtual environment 118 based on the participant's motion capture data. Then in operation 704, the mesh module 512 may retrieve an alternate geometric mesh 804 that defines the terrain and/or object at the location of the participant's avatar 116 in the virtual environment 118. Once the alternate geometric mesh 804 that defines the terrain and/or objects in the virtual environment 118 is obtained, in operation 706, the ray module 504 generates one or more rays 802 (shown in FIG. 8) from a current position of the participant's avatar 116 in the virtual environment 118. The rays may be generated at one or more portions of the avatar's body and the origin of the rays 802 may be a predetermined height above a position of the one or more portions of the avatar's body. Further, the rays may be directed vertically downwards in the virtual environment 118. Once the rays are generated, in operation 708, the offset module 506 can intersect the rays 802 with the alternate geometric mesh 804 as illustrated in FIG. 8. Further, in operation 708, the offset module 506 may determine the point of intersection of each ray 802 with the alternate geometric mesh 804 and a length of the ray at which the ray intersects the alternate geometric mesh 804. Then, in operation 710, the offset module 506 calculates the elevation offset and/or the orientation offset using the point of intersection of each ray 802 with the alternate geometric mesh 804 and/or the length at which each ray 802 intersects the alternate geometric mesh 804. In an example embodiment, the calculation of the elevation and orientation offsets, and the generation of the rays may vary based on an action of the participant 106 in the capture volume 102 and the corresponding action of the avatar 116 in the virtual environment 118. The calculation of offsets for example actions and the navigation through the virtual environment having elevation characteristics while performing said example actions will be described below in greater detail in association with FIGS. 9-15.

After the elevation and/or orientation offset is calculated either using the geometric mesh or the alternate geometric mesh, the simulation engine 402 returns to operation 604 of FIG. 6.

Referring back to FIG. 6, in operation 604 the offset module 506 relays the calculated elevation offset and/or orientation offset to the modification module 510. Alternatively, the offset module 506 determines an updated elevation and/or orientation of the participant's avatar 116 based on the elevation and orientation offsets respectively and the updated elevation and orientation is relayed to the modification module 510. In either case, upon receiving the offsets and/or updates, in operations 604 and 606, the modification module 510 modifies a transformation that maps the participant 106 from the capture volume 102 to the virtual environment 118 to compensate for the offsets or reflect the updates. In an example embodiment, the modification module 510 may modify the translation and rotation parameters of the second transformation matrix that maps the participant 106 from the Cartesian coordinate frame to the virtual environment 118. The modification of the translation and rotation parameters may be such that the position of the participant's avatar 116 in the virtual environment 118 reflects the updated elevation and/or orientation. The process of calculating the updated elevations and orientations for one or more example actions such as walking, falling, jumping, and crawling may be described below in greater detail in association with FIGS. 9-15.

Once the elevation and/or the orientation of the participant's avatar 118 is adjusted in the virtual world 118 based on the modified transformations and the respective offsets, in operation 608, the simulation engine 402 updates a display of the virtual environment to be consistent with the adjusted elevation and/or orientation of the participant's avatar 116. Further, in operation 608, the updated display is fed to the participant 106 in the capture volume 102 through the participant's HMD 112. It must be noted that the updated displays could also be provided to non-participant users through display devices as shown in operation 4 of FIG. 1.

Turning now to FIG. 9-15, these figures illustrate process flow diagrams and graphical representations of navigating a participant's avatar through a virtual environment having elevation characteristics for specific actions while the counterpart participant performs the specific actions along a flat ground surface in the capture volume. Before proceeding with the description of FIGS. 9-15, it should be noted that any threshold value mentioned herein, such as a falling threshold distance, threshold separation distance, and so on, can be modified and updated by a user prior to run-time of the program as desired. Further, it must be noted that even though the following description illustrate a few example actions such as walking, falling, jumping, and crawling, one or ordinary skill in the art can understand and appreciate that the following processes as described in FIGS. 9-15 can be applicable for any other appropriate actions without departing from a broader scope of the description. For example, a process used to calculate offsets for walking can be used for any other appropriate action where the user stands on both his feet such as running or squatting.

Navigating a Virtual Environment while Walking in the Capture Volume

Turning now to FIG. 9, this figure is a flow chart that illustrates a process of simulating a participant's avatar walking in a virtual environment that has elevation characteristics while corresponding participant walks in the flat elevation capture volume, according to certain exemplary embodiments of the present invention. FIG. 9 will be described by making exemplary reference to FIG. 10 as may be appropriate or helpful.

The process begins by calculating an elevation offset of the left and right foot of the participant's avatar 116 in the virtual environment 118. However, in some embodiments, in addition to the elevation offset of each foot, the system may also determine an orientation offset of each foot of the participant's avatar 116. For example, if the participant's avatar is climbing stairs in the virtual environment 118, then the orientation offset of the avatar's knee may be determined in order to render a bent knee in the display. One of ordinary skill in the art can understand that even though the following description associated with walking describes an elevation offset of the left foot and right foot, any other appropriate offsets at any other portions of the avatar's body may be determined and compensated for without departing from a broader scope of the disclosure.

Referring back to operation 902, in operation 902, the ray module 504 generates one or more rays at different portions of each foot of the participant's avatar 116 in the virtual environment 118. For example, rays may be generated at a heel of the foot, toe of the foot, side of the foot, and so on. Once the rays are generated, in operation 904, the offset module 506 may intersect the one or more rays from each foot with an alternate geometric mesh 804 that defines the terrain at a location of the participant's avatar in the virtual environment 118. Then, in operation 906, the offset module 506 may determine a collision point (point of intersection) of each ray with the alternate geometric mesh. Further, the offset module 506 may determine a length of each ray from each foot at a point of intersection of the ray with the alternate geometric mesh 804 from a point of origin of the ray. The length of each ray may represent a distance of each portion of each foot from the terrain (ground surface, stairs, floor or vehicle, etc.) of the virtual environment 118 at a location of the participant's avatar 116. For example, length of a ray from the side of the left foot and toe of the left foot may respectively represent the distance of the side of the left foot and a distance of the toe of the left foot from the ground below in the virtual environment. The distance of the right foot from the terrain for each generated ray at the right foot may be represented as d_right_1, d_right_2, . . . d_right_n, and the distance of the left foot from the terrain for each generated ray at the left foot may be referred to as d_left_1, d_left_2, . . . d_left_n.

Once the one or more rays are generated at each foot and their respective collision points and lengths at which they intersect the alternate geometric mesh are computed, in operation 908, using the collection of rays, the offset module 506 may set the elevation of each foot as the collision point of the ray at the respective foot that represents the highest elevation. For example, if there is a ray generated at the heel and toe of the left foot, the elevation of the left foot may be based on the collision point of the rays from the toe and the heel that represents a higher elevation. In said example, if the collision point of the ray from a toe of the left foot is at y=2 and the collision point of the ray from the heel of the left foot is at y=−20, then the elevation of the left foot may be set based on the collision point of the toe of the left foot. In other words, the collision point at y=2 may represent a higher elevation such as 2000 feet than an elevation represented by the collision point at y=−20 which may be 1980 feet. It must be noted that even though the above mentioned example, and other examples in this description uses the y-coordinate for expository purposes, measurements along other coordinates and calculations using other coordinates are not outside the broader scope of this description. If all collision point of each ray from a foot represents a same elevation, i.e, no change in elevation, then, collision point of any of the rays may be determine the elevation of the respective foot.

Figure 10:
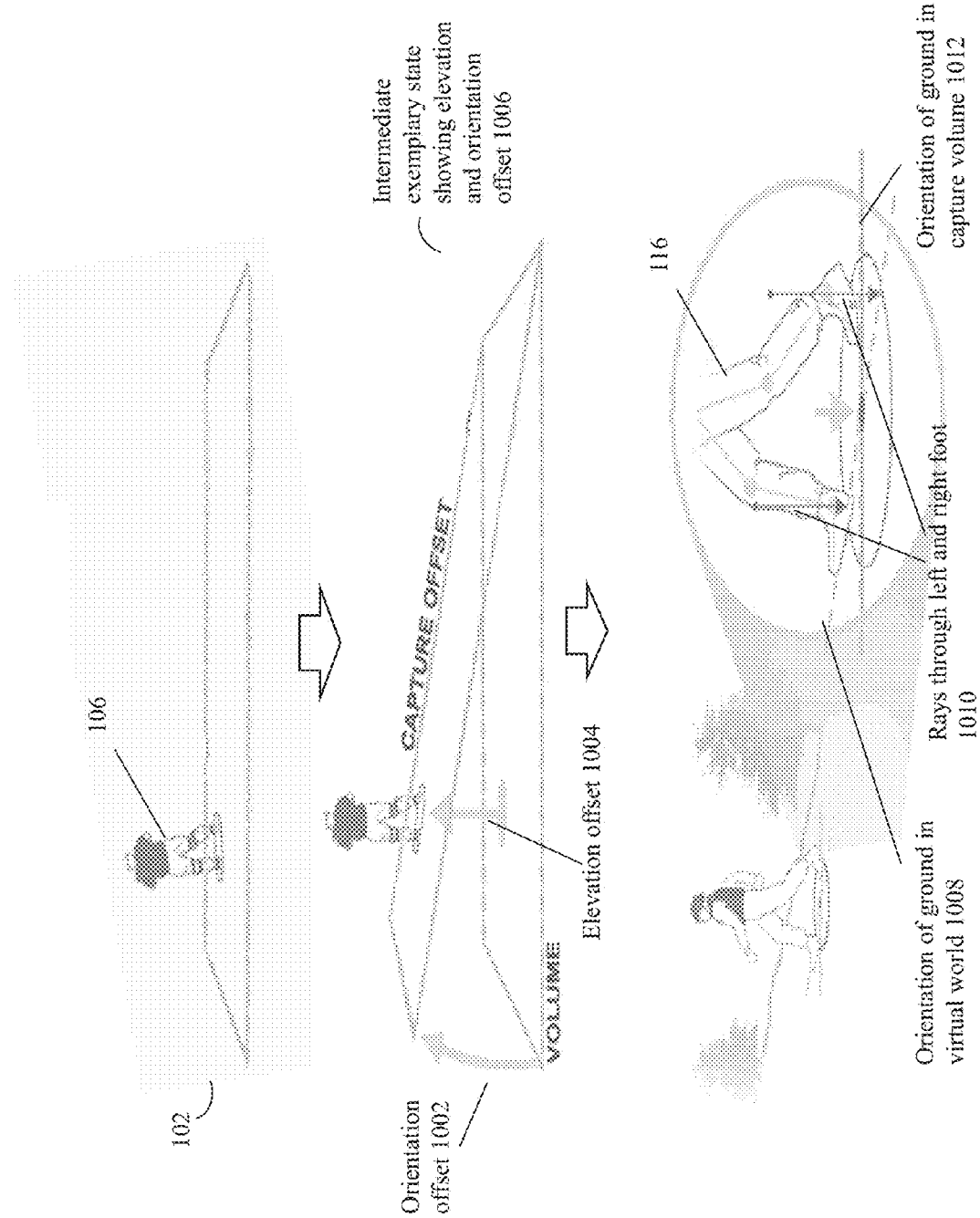
FIG. 10 illustrates a graphical representation associated with the process of simulating the participant's avatar walking in the virtual environment having elevation characteristics, according to certain exemplary embodiments of the present invention.

Alternatively, in operation 902, instead of generating a plurality of rays, the ray module 504 may generate a single ray 1010 at each foot of the participant's avatar 116, for example, at the heel of each foot of the participant's avatar 116 as illustrated in FIG. 10. Further, at operation 904, a collision point of each ray from each foot with the alternate geometric mesh is computed. Once the collision point is determined, in operation 906, the offset module 506 may determine if the elevation drop or distance of each foot from the heel of each foot is greater than a threshold distance, e.g., a threshold of 12 inches along a y-axis. If the distance of each foot from the terrain as determined based on the rays from the heel of each foot is greater than the threshold distance, then, the ray module may generate another set of rays at the toe and/or other portions of each foot of the participant's avatar. The additional rays may be generated to determine if there are any discrepancies or discontinuities in the terrain of the virtual world. For example, there may be a discontinuity (crack) in a road in the virtual world resultant from a design error. In said example, the participant's avatar may be located above the discontinuity such that the heel of the participant's avatar is above the discontinuity and the toe may be on the road. Continuing with the example, if a ray is dropped from the heel of the participant, the collision point of the ray may be at y=−60. If the elevation of the participant's avatar is decided based on the ray from the heel, then the participant's avatar will be dropped down through the discontinuity (crack). To avoid this scenario from occurring, additional rays are dropped at the toe and/or other portions of the foot to ensure that an elevation and/or orientation of the participant's avatar is not updated based on an error or discontinuity in the design of the virtual environment.

Once the additional rays at the toe of each foot are generated and intersected with the alternate geometric mesh, the collision point of each foot with the terrain is determined based on the rays from the toe. Then, the offset module checks if the distance of the foot obtained from the rays at the toe (herein 'toe elevation drop') of the foot is less than the distance of the foot obtained from the rays at the heel (herein 'heel elevation drop'). If the toe elevation drop is lesser than the heel elevation drop, then the toe elevation is set as the elevation offset of the foot, otherwise the heel elevation drop is set as the elevation offset of the foot. Alternatively, the collision point that represents the higher elevation is chosen for determining the elevation of each foot. Accordingly, a single elevation offset may be obtained for each foot of the participant's avatar 116 in the virtual environment 118, which is used in the further steps, in general, either to average for the actual elevation change, to use the highest of the two if the elevation differences are greater than some threshold, or to start (or continue) the falling of the participant's avatar if both elevation changes are greater than a falling threshold. It must be noted that the above use of heel and toe rays could always be computed, regardless of checking against the threshold. The generation of additional rays based on the threshold check may be implemented to reduce the number of computations.

Once the elevation of each foot is determined, in operation 910, the simulation engine 402 checks a status flag associated with the participant's avatar 116 that indicates if the participant's avatar 116 is falling. If the status flag (herein 'fall check flag') indicates that the participant's avatar 116 is falling, then, in operation 912, the simulation engine 402 proceeds to check if the participant's avatar 116 is close to landing from the fall. In one example embodiment, to determine if the participant's avatar 116 is close to landing from the fall, the simulation engine 402 drops rays from each of the left foot and the right foot to determine if the elevation drop of the foot that is closer to the ground is lesser than a landing threshold distance. In one example, the landing threshold distance is the distance that the participant's avatar 116 would fall in two cycles of the program, where each cycle is 1/60 seconds. If the foot that is closer to the ground is lesser than the landing threshold, then the simulation engine 402 determines that the participant's avatar 116 is close to landing.

If the participant's avatar is close to landing, then, in operation 914, simulation engine 402 stops a falling of the participant's avatar 116 and updates the fall check flag to indicate that the participant's avatar is not falling anymore. In addition, in operation 914, the elevation of the participant's avatar 116 is set as the closest landing height. The closest landing height is determined based on the elevation drop of the foot that is closest to the ground at the time of the check in operation 912. For example, while the participant's avatar 116 is falling, the system checks the distance of the left foot and the right foot from the ground. In said example, at the time of check, the distance of the right foot and the left foot from the ground in the virtual environment may be 8 inches and 3 inches respectively, and the landing threshold distance is 4 inches. Continuing with the example, since the left foot is closer to the ground at the time of the check and the distance of the left foot is less than the landing threshold distance of 4 inches, the simulation engine 402 stops the fall of the participant's avatar, updates the fall check flag and sets the elevation of the participant's avatar based on the distance of the left foot from the ground in the virtual environment, i.e., 3 inches from the terrain of the virtual environment 118. Alternatively, the collision point of a ray from the foot that is closest to the terrain may be used to determine the elevation of the participant's avatar once the participant's avatar has landed. Once the falling is stopped and the participant's avatar 116 has landed, the operation of the simulation engine 403 proceeds to operation 918 (shown in 'FIG. 9D') which will be discussed in greater detail further below.

Now referring back to operation 912, if the simulation engine 402 determines that the participant's avatar 116 is not close to landing, then in operation 914, the simulation engine 402 updates the elevation of the participant's avatar 116 based on time of fall and velocity of fall (gravity) for the cycle of the program. Then, the simulation engine 402 returns to operation 902 for calculating the offset parameters associated with the participant's avatar for the next cycle of the program.

Now referring back to operation 910, if the fall check flag associated with the participant's avatar 116 indicates that the participant's avatar 116 is not falling, then, in operation 924, the simulation engine 402 checks if the participant's avatar 116 is jumping. If the simulation engine 402 determines that the participant's avatar 116 is jumping then the simulation engine 402 proceeds to execute operation 1404. The process of jumping including operation 404 is described in greater detail further below in association with FIG. 14.

However, if the simulation engine 402 determines that the participant's avatar 116 is not jumping, then, in operation 926, the simulation engine 402 determines if the distance of the left foot and the right foot from the ground is greater than a falling threshold distance, for example, 60 inches. If the distances of each foot is greater than the falling threshold distance, then, in operation 928, the simulation engine 402 simulates a falling of the participant's avatar 116. In particular, in operation 928, the fall check flag is updated to indicate the participant's avatar 116 is falling and the elevation of the participant's avatar 116 is updated for the current cycle of the program or the current time frame. Once the elevation is updated for the current time frame or cycle of program, the simulation engine 402 goes back to operation 902 for calculating the offset parameters associated with the participant's avatar for the next cycle of the program.

Figure 9A:
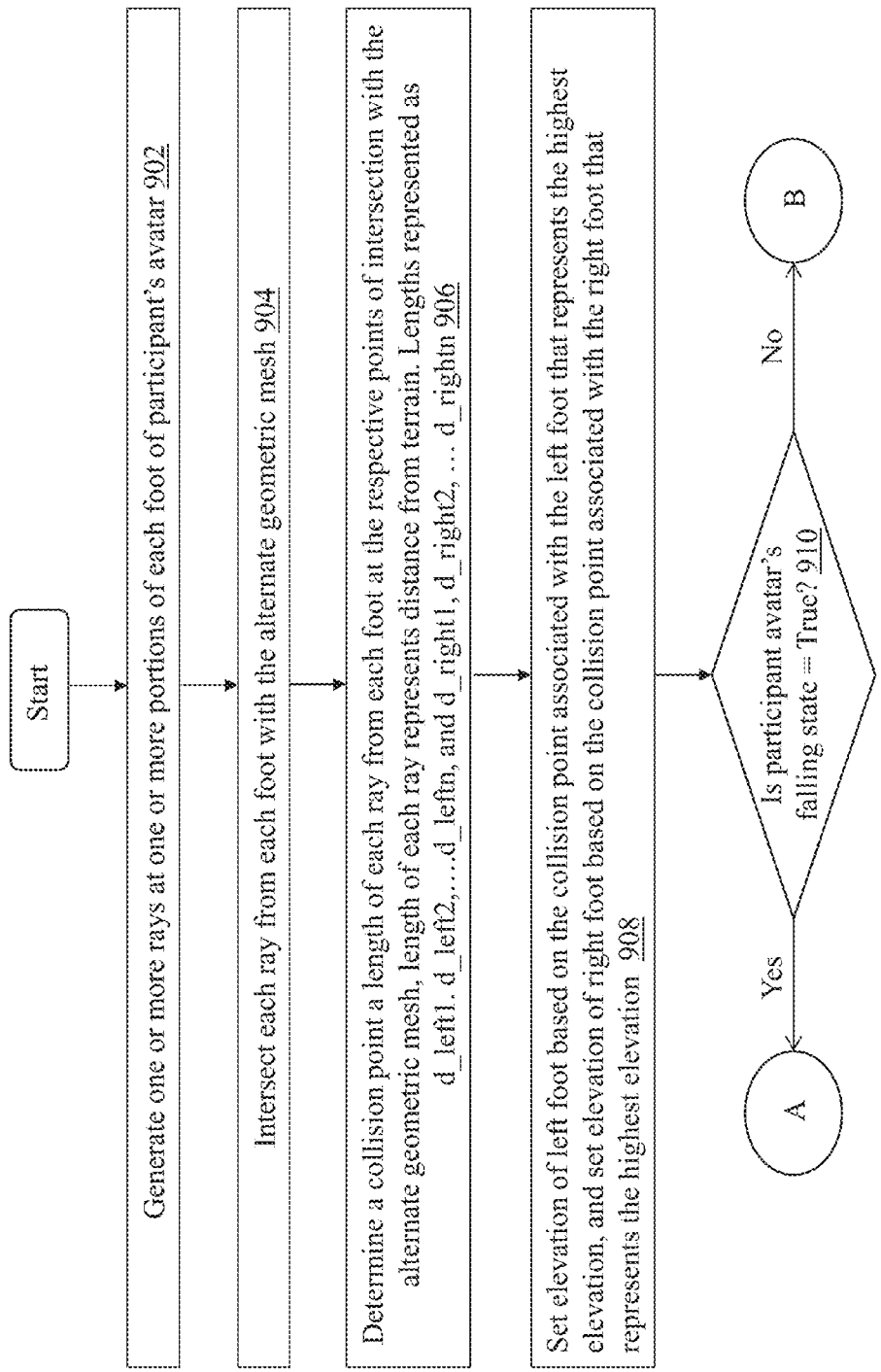
FIGS. 9A-9D (collectively 'FIG. 9') are flowcharts that illustrate a process of simulating a participant's avatar walking in a virtual environment that has elevation characteristics while corresponding participant walks in the flat elevation capture volume, according to certain exemplary embodiments of the present invention.
Figure 9B:
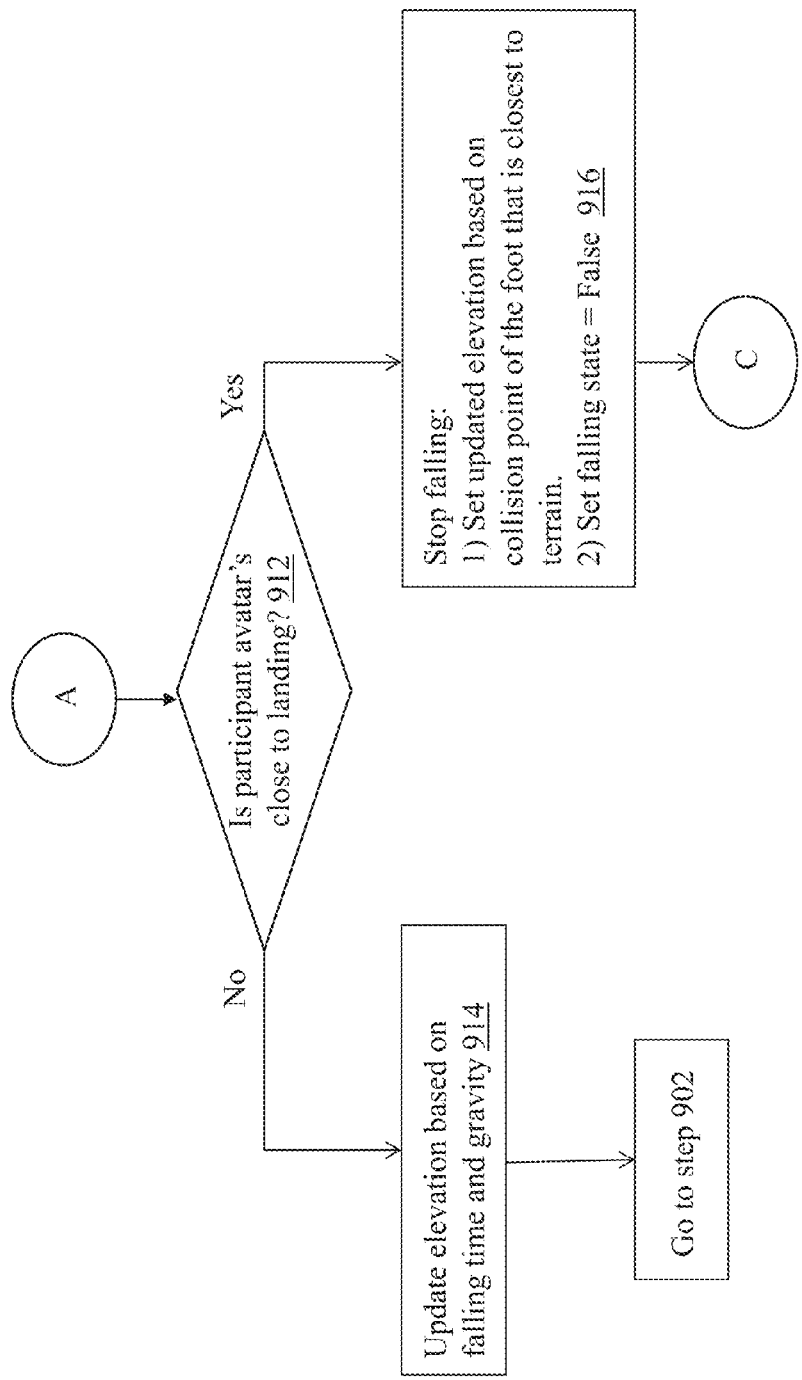
Figure 9C:
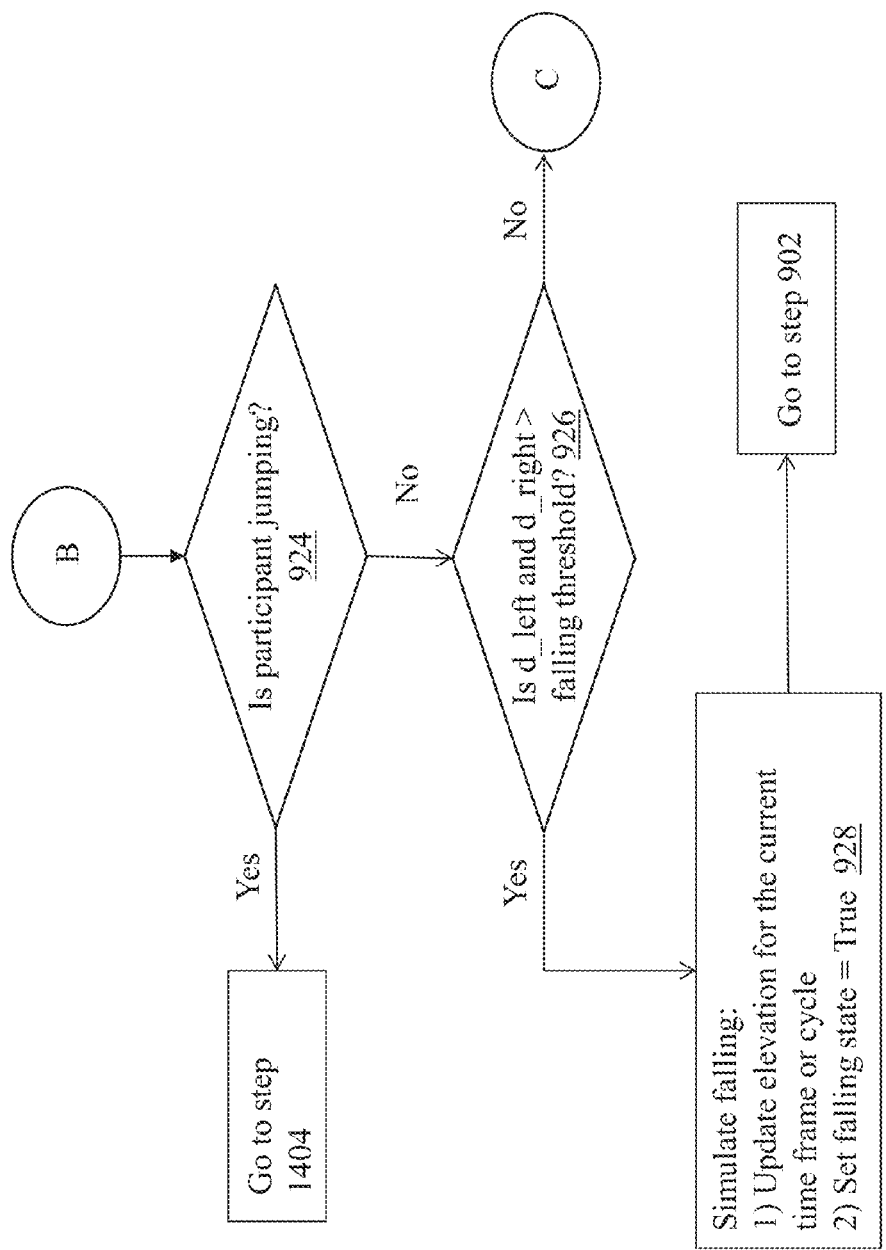
Figure 9D:
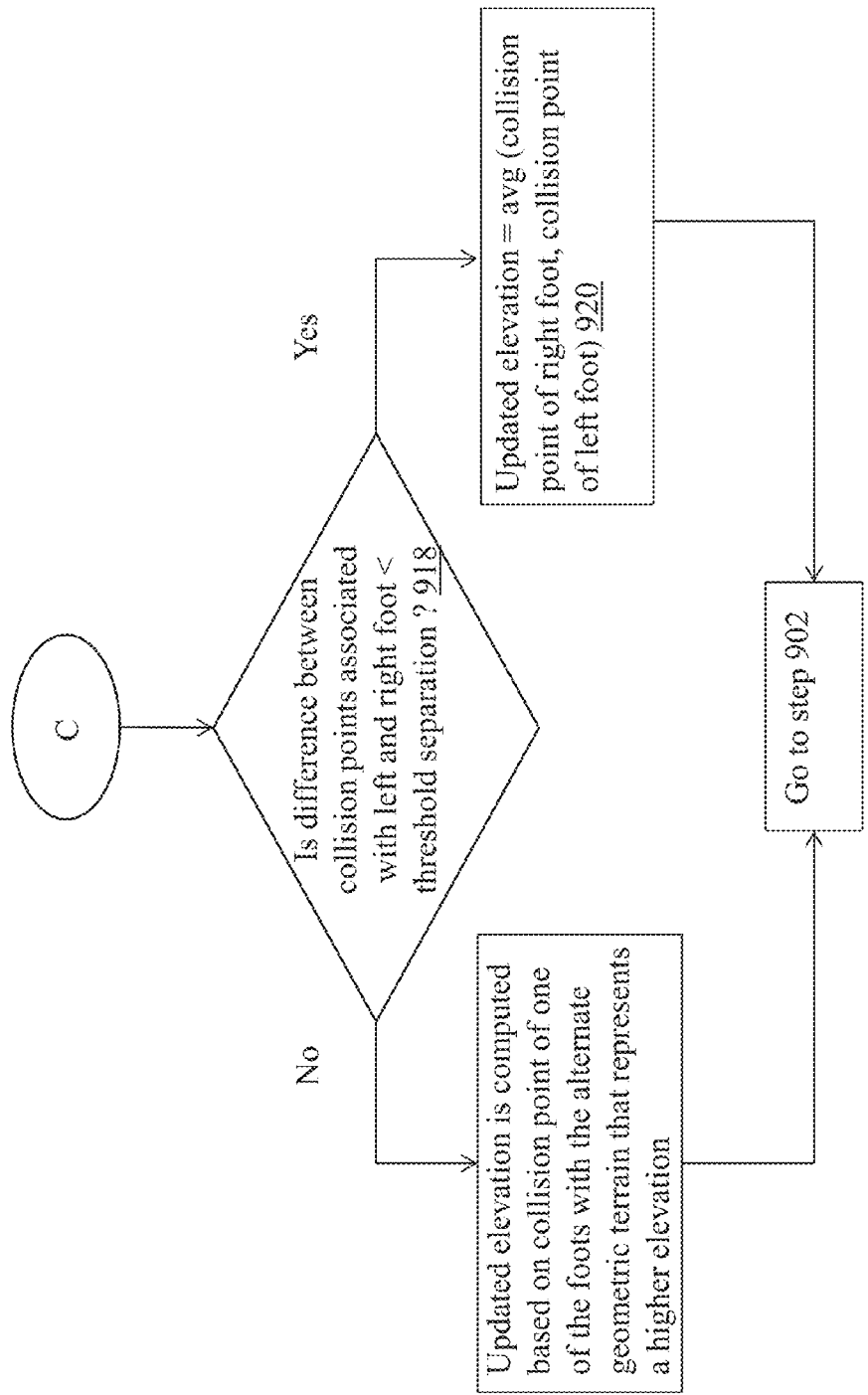

In operation 926, if the simulation engine 402 determines that the distance of each foot is lesser than a falling threshold distance, the simulation engine 402 proceeds to execute operation 918 (shown in 'FIG. 9D'). In operation 918, the simulation engine 402 computes a difference between the collision points of the rays from the left and right foot with the alternate geometric mesh that defines the terrain of the virtual environment 118. Further, the simulation engine 402 determines if the difference is less than a threshold separation distance, for example 50 inches. If the difference is less than the threshold separation distance, then, in operation 920, the simulation engine 402 calculates an average of the collision point of the left foot with the ground and the collision point of the right foot with the ground of the virtual environment 118. Then, the calculated average is set as the updated elevation of the participant's avatar 116.

However, in operation 918, if the simulation engine 402 determines that the difference is greater than a threshold separation distance, then, in operation 922, the elevation of the participant's avatar 116 is updated and set as the higher (with respect to elevation) of the left and right foot collision points in the virtual environment 118. For example, if the collision point of the ray from the right foot with the collision mesh is at y=10 and the collision point of the ray from the left foot with the collision mesh is at y=4, then the elevation of the avatar is set based on the collision point of the ray at the right foot which represents a higher elevation than the collision point of the ray at the left foot. Once the updated elevation of the participant's avatar 116 is computed, the simulation engine 402 returns to operation 902 for the next cycle of the program or for the next time frame of the simulation.

In one example, the origin of the first ray 1010 is generated at a specified offset from the position of the avatar's left foot as illustrated in FIG. 10. The direction of the first ray is vertically downwards in the virtual world. The origin of the second ray 1010 is generated at a specified offset from the position of the avatar's right foot as illustrated in FIG. 10. The direction of the second ray is vertically downwards in the virtual world. In this embodiment the specified offset, referred to as short-step-offset, is the same for both the left and right foot. A typical value for the short-step-offset is 12 inches in the vertical and zero in the horizontal, that is, the origin of the left foot ray is exactly 12 inches above the left foot origin point and similarly for the ray associated with the right foot. The purpose of the short-step-offset is to allow the subject's avatar to 'step up' for small elevation changes without requiring the subject to actually perform the physical act of stepping up. This is beneficial in at least a couple of ways: first, the subject does not have to perform the awkward motion of stepping up on an object in the virtual world that is actually not present in the physical world and secondly, the subject does not have to be aware of all the small changes in elevation in the virtual world, such as curbs, small steps, etc. to navigate naturally and easily in the virtual world. After the intersections of the rays with the virtual world have been computed they can then be used to determine if an update to the elevation offset should be computed and what is the updated value of this elevation offset. In this embodiment an update to the elevation offset is only performed if the left and right foot intersection points differ by less than a specified value, threshold separation distance, in the vertical axis. A nominal value for the threshold separation distance is 60 inches. Thus, if the avatar is standing at the edge of a balcony that is greater than 60 inches from the floor below, and the avatar has one foot on the floor of the balcony and the second foot off the floor of the balcony, then no update of the vertical capture offset will occur or the distance of the elevation offset of the foot that is on the floor is set as the elevation offset of the participant's avatar. However, if the intersection separation is less than the threshold separation limit then the elevation offset is updated to be the average of the left and right foot intersections along the vertical axis.

In the above-mentioned example, even though the description states that the avatars elevation is not updated if one foot is outside the balcony over a 60 inch drop in the virtual world and the other is on the floor of the balcony, one of ordinary skill in the art can understand and appreciate that the system can make a determination if the avatar has to be dropped face down if he is too far off the balcony (e.g., based on center of gravity calculations), and consequently drop the avatar face down or backwards without departing from the broader scope of this description.

Navigating a Virtual Environment while Crawling in the Capture Volume

Figure 11:
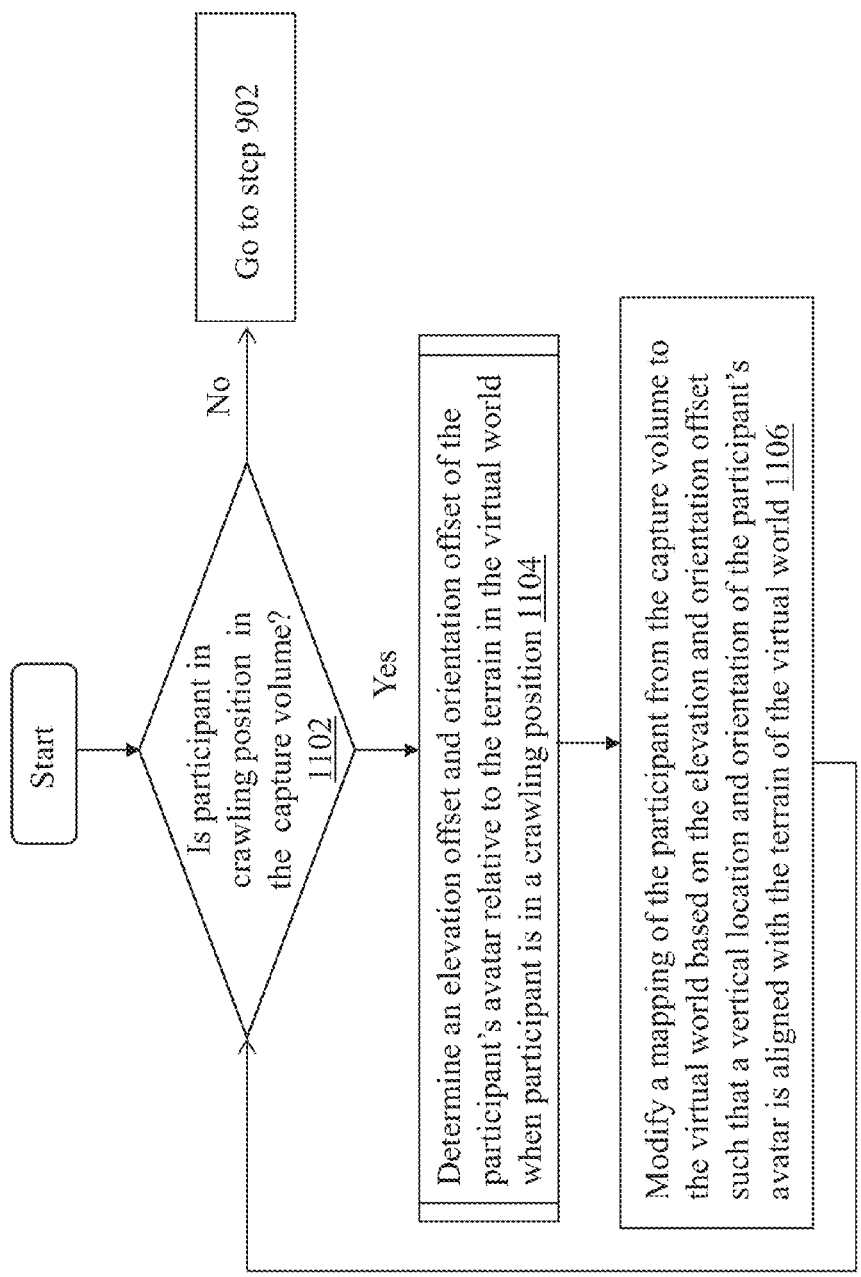
FIG. 11 is a flow chart that illustrates a process of simulating a participant's avatar crawling in a virtual environment that has elevation characteristics while corresponding participant crawls in the flat elevation capture volume, according to certain exemplary embodiments of the present invention.

Turning now to FIG. 11, this figure is a flow chart that illustrates a process of simulating a participant's avatar crawling in a virtual environment that has elevation characteristics while corresponding participant crawls in the flat elevation capture volume, according to certain exemplary embodiments of the present invention. FIG. 11 will be described by making exemplary reference to FIGS. 12 and 13 as may be appropriate or helpful.

Figure 13:
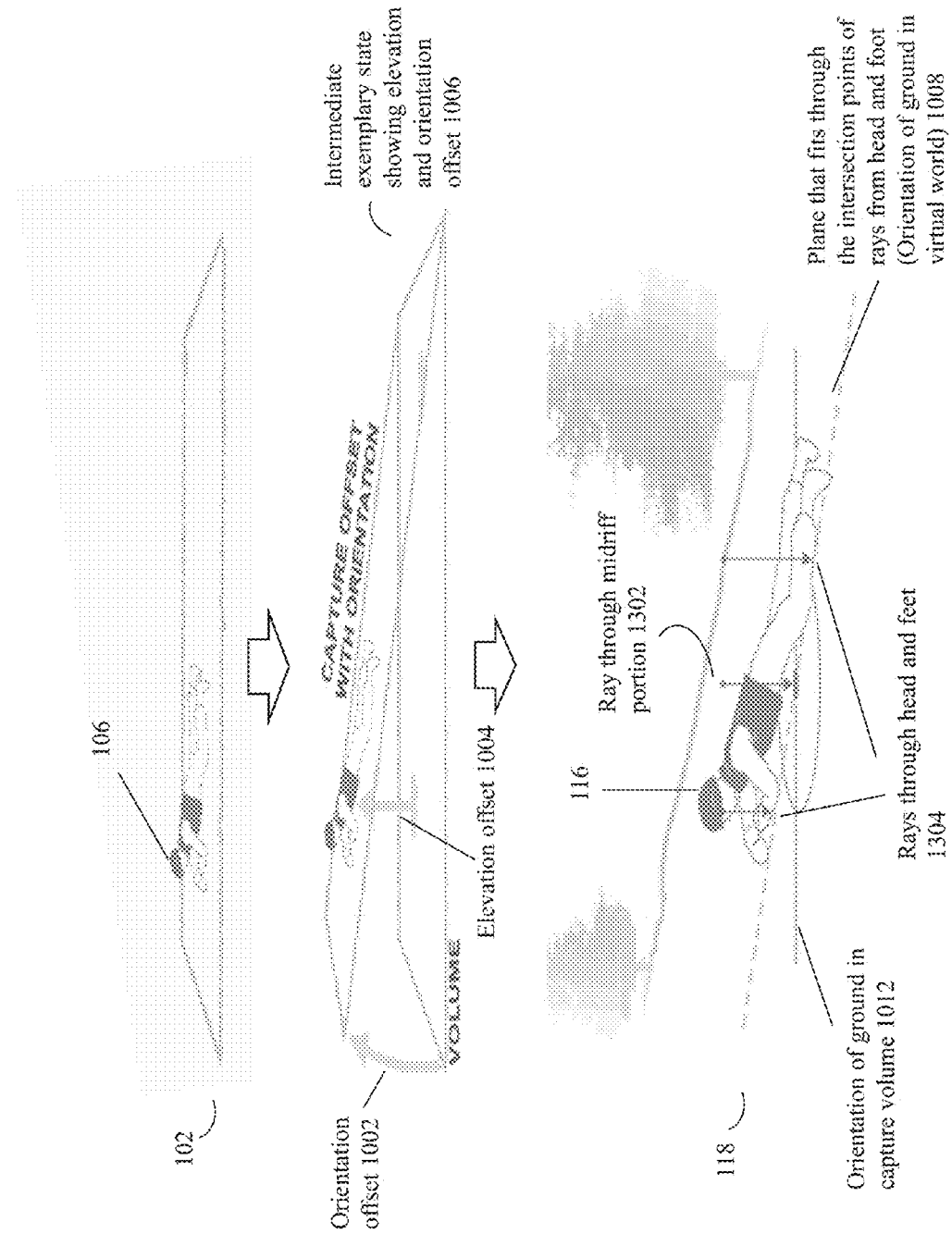
FIG. 13 illustrates a graphical representation associated with the process of simulating the participant's avatar crawling in the virtual environment having elevation characteristics, according to certain exemplary embodiments of the present invention.

The process begins at operation 1102 where the simulation engine 402 determines if the participant 106 in the capture volume 102 is in a prone position as illustrated in FIG. 13. To determine if the participant 106 is in a prone position, in one example, the simulation engine 402 computes a vertical distance of the head and waist of the participant 106 from the ground surface of the capture volume 102 and a relative separation distance of the waist and head positions of the participant 106 in the capture volume 102. Once the vertical distances and the relative separations are computed, the simulation engine 402 determines if the relative vertical distance and the relative separation distance meets a threshold criteria. If each of the relative vertical distance and the relative separation meets a threshold criteria, then the simulation engine 402 determines that the participant 106 is in a prone position. For example, if the relative vertical distance is small, roughly on the order of less than 12 inches, and the relative separation of the waist and head is approximately, e.g. 80% than that of the participant 106 in an upright position, then the simulation engine 402 may determine that the participant 106 in the capture volume 102 is in a prone position. One of ordinary skill in the art can understand and appreciate that any other appropriate means can be used to determine if the participant in the physical world is in a prone position without departing from a broader scope of this description.

If the participant is determined to be in the prone position, then in operation 1104, the simulation engine 402 translates the avatar to the proper vertical position and orients the avatar along the slope of the terrain, e.g., stairs, incline, etc., that the subject is currently navigating in the virtual world. Accordingly, the offset module 506 of the simulation engine 402 determines an elevation offset 1004 and an orientation offset 1002 of the participant's avatar 116 in the virtual environment 118 with respect the terrain of the virtual environment 118 as illustrated in FIG. 13. Operation 1104 will be described below in greater detail in association with FIG. 12.

Figure 12:
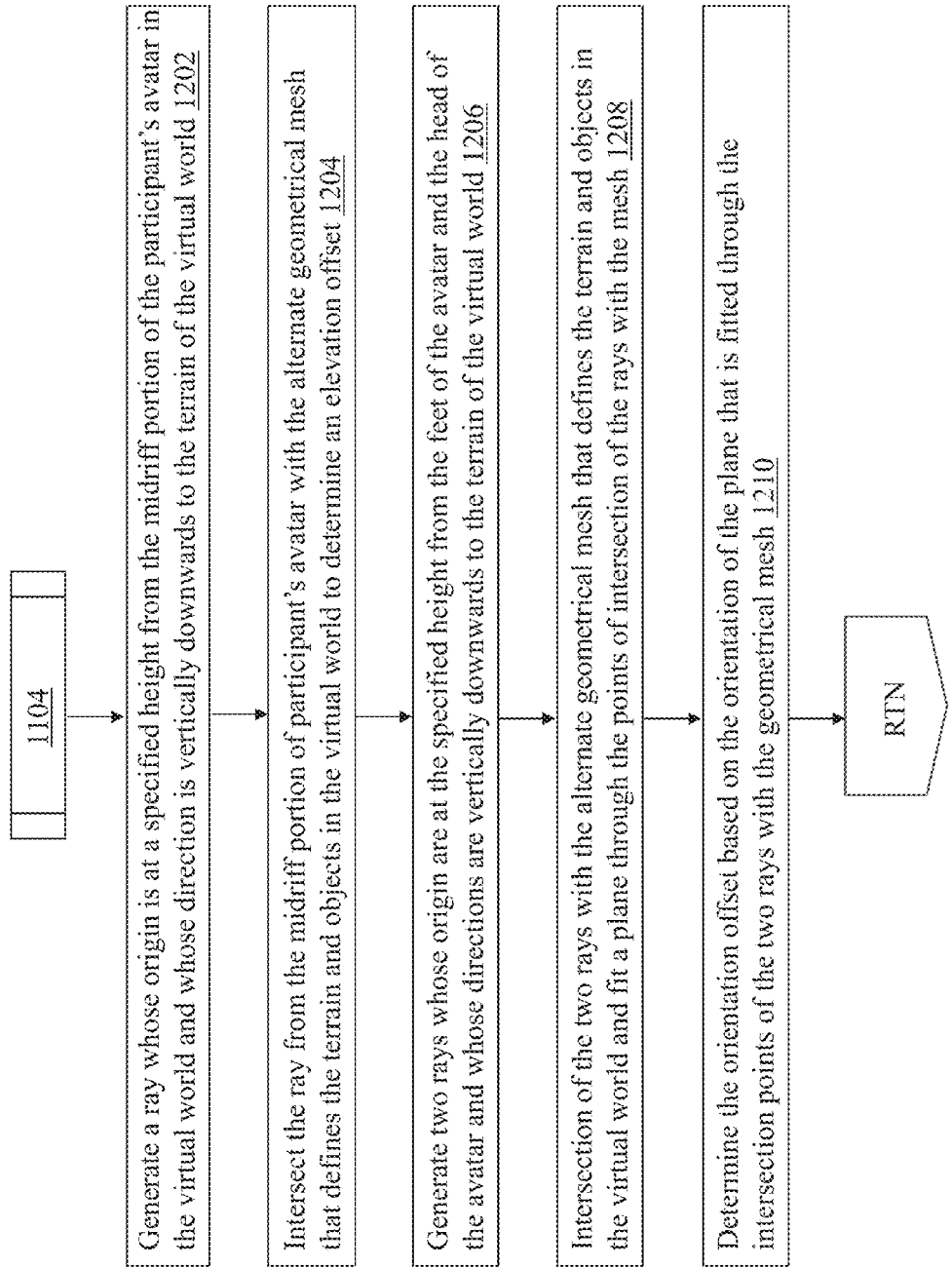
FIG. 12 is a flow chart that illustrates a process of determining elevation offsets and orientation offsets in the virtual environment when the participant's avatar is crawling in the virtual environment, according to certain exemplary embodiments of the present invention.

FIG. 12 is a flow chart that illustrates a process of determining elevation offsets and orientation offsets in the virtual environment when the participant's avatar is crawling in the virtual environment, according to certain exemplary embodiments of the present invention. To determine the elevation offset, in operation 1202, the ray module 504 generates a ray 1302 at a midriff portion or waist of the participant's avatar 116 whose origin is at a predetermined height above the position of the waist and whose direction is vertically downwards as illustrated in FIG. 13. Then, in operation 1204, the offset module 506 computes the collision point of the ray 1302 at the waist of the participant's avatar 116 against the alternate geometrical mesh 804 that defines the virtual world 118. Once the collision point is computed, the offset module 506 sets the elevation of the participant's avatar 116 based the collision point. For example, if the collision point is at y=10 along the y-coordinate, the elevation of the participant's avatar is set at y=10, i.e., the participant's avatar is laid along a plane that passes through y=10. In an example embodiment, this plane at y=10 coincides with the plane of the floor of the capture volume 102 mapped to the virtual world 118. That is, if in the prone position the participant's waist is 12 inches off the capture volume floor, then in the virtual world 118 the avatar's waist will be 12 inches above the plane that passes through y=10. The orientation of the plane is decided based on collision points of additional rays generated at other portions of the avatars body as described below.

Since, typically the orientation 1012 of the floor in the physical capture volume 102 is level, the participant's avatar 116, without any rotation or translations, will also appear horizontal in the virtual environment 118 even though the participant's avatar 116 is potentially navigating a steep incline. To correct for this anomaly, an orientation adjustment is also applied to the mapping from the physical capture volume 102 to the virtual environment 118 such that the avatar now lies along the incline in the virtual environment 118. To compute the orientation of a terrain of the virtual environment 118, the average incline of the virtual environment 118 in the near vicinity of the participant's avatar 116 is determined. Further, an orientation offset 1002 of the participant's avatar 118 with respect to the orientation of a terrain in the virtual environment 118 is computed. To compute the orientation offset 1002 of the participant's avatar 116, in operation 1206, the ray module 504 generates a collection of rays forward and aft of the participant's avatar 116. For example, rays 1304 are generated at a head and the feet of the participant's avatar 116 as illustrated in FIG. 13. Then, in operation 1208, the offset module 506 computes an intersection of the rays 1304 with the alternate geometric mesh 804 that defines the virtual environment 118 and a plane 1008 is fitted through the points of intersection of the rays 1304 with the geometric mesh. The orientation of the plane provides the orientation of the terrain of the virtual environment 118 in the near vicinity of the participant's avatar 118. Once an orientation and/or incline of the plane 1008 is determined, in operation 1208, the orientation offset 1002 of the participant's avatar 118 with respect to the orientation of the plane is determined.

In another embodiment, rays may be generated and intersected with the alternate geometric mesh as described in operations 902 to 908 of FIG. 9 with an addition of generating rays from the waist of the participant's avatar 116. In either case, after determining the orientation offset 1002 and the elevation offset 1004 of the participant's avatar 116, the offset module 506 proceeds to operation 1106 of FIG. 11.

Referring back to FIG. 11, in operation 1106, the offset module 506 may relay the calculated elevation offset 1004 and the orientation offset 1002 to the modification module 510. Upon receiving the elevation offset 1004 and the orientation offset 1002, the modification module 510 may adjust translation and rotation values of the transformation matrix to modify a mapping of the participant 106 from the capture volume 102 to the virtual environment 118 such that the participant's avatar 116 is aligned to the terrain of the virtual environment 118. In other words, in operation 1106, the orientation of the plane 1008 and the elevation offset 1004 may be used to adjust the orientation and elevation of the participant's avatar 116, along one or more axes to map the participant 106 from the physical capture volume to the virtual environment 118. As a result the participant 106 may be allowed to crawl (in a prone position) up and down inclines, stairs, undulating and steep terrain as illustrated in FIG. 13.

Referring back to operation 1102, if the simulation engine 402 determines that the participant 106 in the capture volume 102 is not in a prone position, then in operation 1104, the simulation engine 402 goes back to operation 902 of FIG. 9 for calculating offset parameters associated with the participant's avatar for the next cycle of the program.

Navigating a Virtual Environment while Jumping in the Capture Volume

Figure 14:
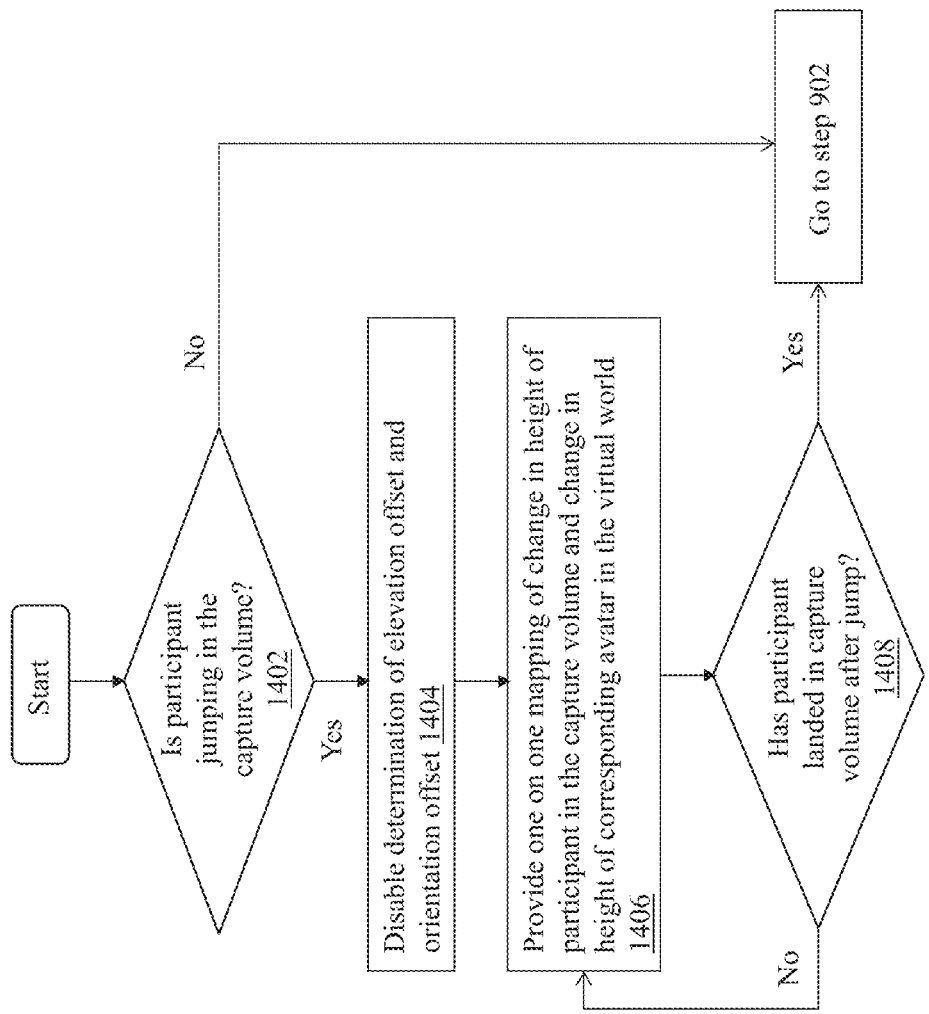
FIG. 14 is a flow chart that illustrates a process of simulating a participant's avatar jumping in a virtual environment that has elevation characteristics while corresponding participant jumps in the flat elevation capture volume, according to certain exemplary embodiments of the present invention.

Turning now to FIG. 14, this figure is a flow chart that illustrates a process of simulating a participant's avatar jumping in a virtual environment that has elevation characteristics while corresponding participant jumps in the flat elevation capture volume, according to certain exemplary embodiments of the present invention. FIG. 14 will be described by making exemplary reference to FIG. 15 as may be appropriate or helpful.

Figure 15:
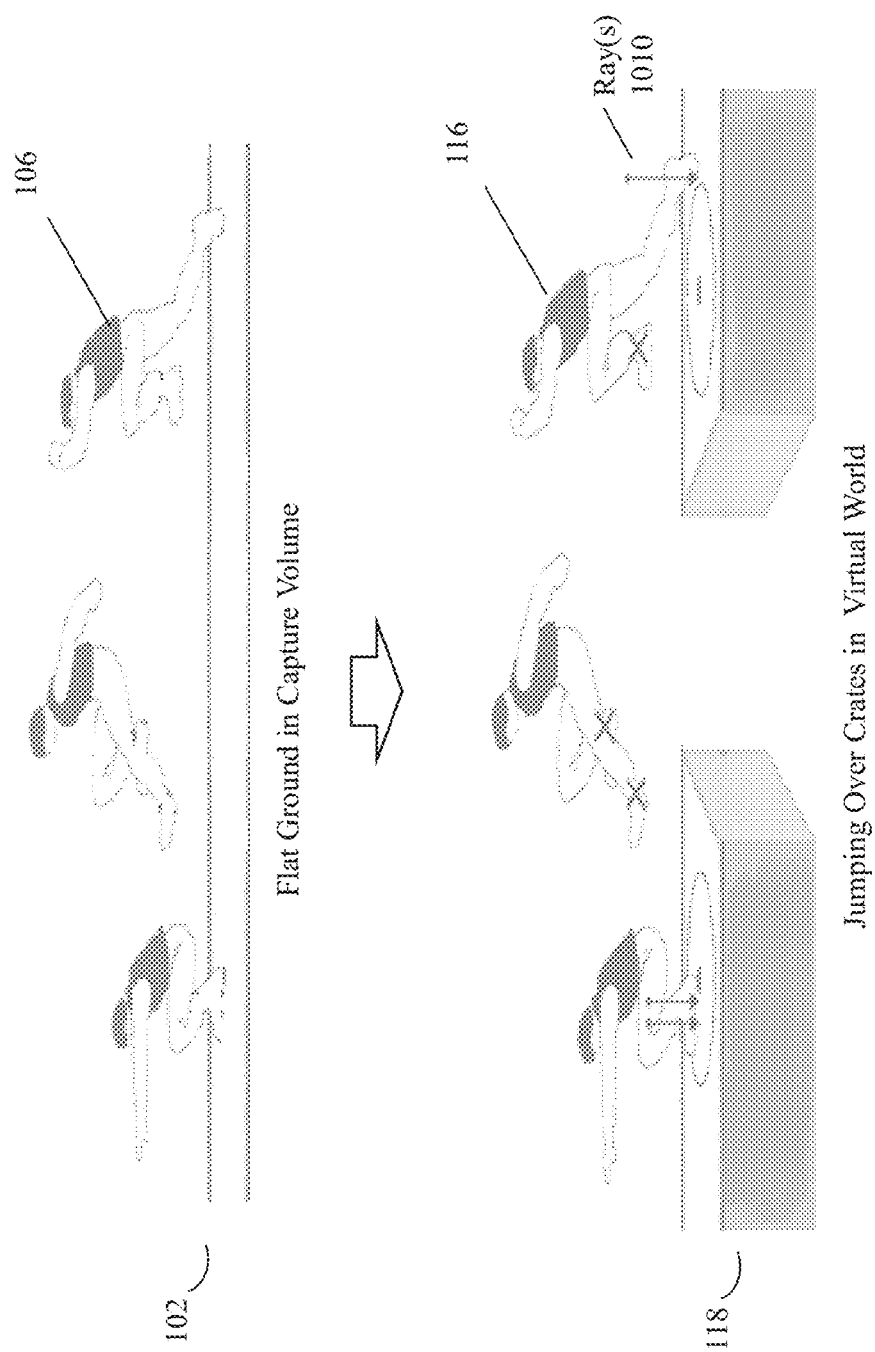
FIG. 15 illustrates a graphical representation associated with the process of simulating the participant's avatar jumping in the virtual environment having elevation characteristics, according to certain exemplary embodiments of the present invention.

The process begins at operation 1402 where the simulation engine 402 determines if the participant 106 in the capture volume 102 is jumping as illustrated in FIG. 15. The simulation engine computes the distance of the left and right feet of the participant 106 in the physical capture volume 102 from the ground surface of the capture volume 102, and if the distance of both the feet are above a nominal value, for example 8 inches, then the simulation engine 402 determines that the participant 106 is jumping. (This implementation can also be modified with respect to the relative position, in the physical volume, of other bodies such as the waist with respect to the feet to exclude the possibility of the subject lying on his back with his feet in the air.)

Once it is determined that the participant 106 in the capture volume 102 is jumping, the simulation engine 402 allows the participant's avatar 116 to jump in the virtual environment 118 as illustrated in FIG. 15. One example embodiment, to allow the participant's avatar 116 to jump along with the participant 106, in operation 1404, the simulation engine 402 disables the determination of the elevation offsets and the corresponding update of the avatar's elevation based on the offset. By disabling the update of the elevation offset, in operation 1406, the simulation engine 402 provides a one-to-one mapping of the change in height of the participant 106 in the physical volume 102 and the change in height of the participant's avatar 116 in the virtual world 118.

In operation 1408, the simulation engine 402 determines that the participant's jump in the capture volume 102 is completed. The completion of the jump in the capture volume 102 may be determined based on the distance of the participant's left foot and right foot from the ground surface of the capture volume 102. When the jump is completed and the subject 'lands' in the physical volume then the normal updates of the elevation offset using rays 1010 occur and the participant's avatar 116 continues navigating along the current building, terrain, etc. in the virtual world as illustrated in FIG. 15. In particular, in FIG. 15, the participant 106 is jumping across two crates in the virtual world 118. Prior to the jump the subject is standing on the right crate. Thus at this point the ground floor of the capture volume 102 is level with the top surface of the crate in the virtual world 118. When the subject jumps in the physical capture volume 102 the mapping of the physical volume 102 to the virtual world 118 is not updated (indicated by Xs at his feet), so the jump occurs likewise in the virtual world 118 as in the physical capture volume 102. When the subject lands in the physical capture volume the ray intersections are once again computed and the participant's avatar elevation in the virtual world 118 is updated to place him on the surface of the left crate. In another example, if the participant's avatar 118 is jumping from the bottom of a ramp to the top of the ramp in the virtual world 118, at the end of the participant's jump in the capture volume 102, even though the participant 106 lands on a level surface at the same elevation as prior to jump in the capture volume 102, the participant's avatar may be placed on top of the ramp in the virtual environment 118.

Once the participant has landed from the jump and it is determined in operation 1402 that the participant 106 in the capture volume 102 is not jumping, the simulation engine 402 goes back to operation 902 of FIG. 9 for calculating offset parameters associated with the participant's avatar for the next cycle of the program.

Although specific operations are disclosed in the flowcharts illustrated in FIGS. 6, 7, 9, 11, 12, and 14, such operations are exemplary. That is, embodiments of the present invention are well suited to performing various other operations or variations of the operations recited in the flowcharts. It is appreciated that the operations in the flowcharts illustrated in FIGS. 6, 7, 9, 11, 12, and 14 may be performed in an order different that presented, and that not all of the operations in the flowcharts may be performed.

All, or a portion of, the embodiments described by the flowcharts illustrated in FIGS. 6, 7, 9, 11, 12, and 14 can be implemented using computer-readable and computer-executable instructions which reside, for example, in computer-usable media of a computer system or like device. As described above, certain processes and operations of the present invention are realized, in one embodiment, as a series of instructions (e.g., software programs) that reside within computer readable memory of a computer system and are executed by the processor of the computer system. When executed, the instructions cause the computer system to implement the functionality of the present invention as described above.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method for moving an avatar in a virtual environment along an elevation based on a movement of a person in a motion capture volume along a substantially level ground surface, the method comprising:

mapping the person from the motion capture volume to the virtual environment, wherein the person is represented by the avatar in the virtual environment;

determining an offset in the elevation and an offset in an orientation of the avatar in the virtual environment with respect to a terrain of the virtual environment in correlation to an elevation and an orientation of the person in the motion capture volume, wherein determining the offset in the elevation and the offset in the orientation of the avatar in the virtual environment comprises:

generating, by a computer, one or more rays in the virtual environment that originate at a predetermined height above one or more portions of the avatar's body in the virtual environment and are directed towards the terrain of the virtual environment, wherein the one or more portions of the avatar's body from which the one or more rays are generated are determined based on an action of the person in the motion capture volume;

intersecting the one or more rays with a collision mesh that defines the terrain of the virtual environment; and computing a point of intersection of each of the one or more rays with the collision mesh;

adjusting, by the computer, the elevation and the orientation of the avatar in the virtual environment to compensate for the offset in the elevation and the offset in the orientation of the avatar and to align the avatar with the terrain of the virtual environment; and displaying, to the person in the capture volume, a view of the virtual environment from the adjusted elevation and orientation of the avatar in the virtual environment.

2. The method of claim 1, wherein the step of adjusting the elevation and the orientation of the avatar to compensate for the offset in the elevation and the offset in the orientation of the avatar comprises modifying a transformation that maps the person from the capture volume to the virtual environment based on the offset in the elevation and the offset in the orientation of the avatar.

3. The method of claim 1, further comprising computing the offset in the elevation and the offset in the orientation of the avatar based on the points of intersection of the one or more rays with the collision mesh.

4. The method of claim 1, wherein the one or more rays are generated at each foot of avatar.

5. The method of claim 1, wherein the one or more rays are generated at a toe portion and a heel portion of each foot of the avatar.

6. The method of claim 1, wherein the one or more rays are generated at a head portion, a midriff portion, and a feet portion of the avatar.

7. The method of claim 1, wherein adjusting the elevation and the orientation of the avatar in the virtual environment comprises:
setting the elevation of the avatar as an average of the point of intersection of a ray generated at a left foot of the avatar with the collision mesh that defines the terrain of the virtual environment and the point of intersection of a ray generated at a right foot of the avatar with the collision mesh.

8. The method of claim 1, wherein adjusting the elevation and the orientation of the avatar in the virtual environment comprises:
setting the elevation of the avatar as one of the point of intersection of a ray from a right foot and the point of intersection of a ray from the left foot of the avatar with the collision mesh that defines the terrain of the virtual environment, wherein a selected point of intersection represents a higher elevation than the point of intersection that is not selected.

9. The method of claim 1, wherein adjusting the elevation and the orientation of the avatar in the virtual environment comprises:
setting the elevation of the avatar as a collision point of a ray generated at a midriff portion of the avatar with the collision mesh that defines the terrain of the virtual environment.

10. The method of claim 1, wherein adjusting the elevation and the orientation of the avatar in the virtual environment comprises:
setting the orientation of the avatar as an orientation of a plane that fits through the point of intersection of a ray generated at the head of the avatar with the collision mesh that defines the terrain of the virtual environment at a location of the avatar and the point of intersection of a ray generated at the feet of the avatar with the collision mesh.

11. The method of claim 1, wherein adjusting the elevation and the orientation of the avatar in the virtual environment comprises:
disabling the determination of the offset in the elevation and the offset in the orientation of the avatar when the person in the motion capture volume is performing a jumping motion; and
providing a one to one mapping of the person in the motion capture volume to the avatar in the virtual environment.

12. The method of claim 11, further comprising:
enabling the determination of the elevation offset and the orientation offset of the avatar when the person in the motion capture volume has landed at the end of the jumping motion.

13. The method of claim 1, wherein adjusting the elevation and the orientation of the avatar in the virtual environment comprises:
simulating a falling of the avatar in the virtual environment based on a determination that a distance of right foot and left foot of the avatar from the terrain of the virtual environment is greater than a threshold falling distance,
wherein the distance of the right foot and left foot of the avatar from the terrain of the virtual environment is determined based on the point of intersection of a ray generated at the left foot and the point of intersection of a ray generated at the right foot of the avatar with the collision mesh that defines the terrain of the virtual environment.

14. The method of claim 13, wherein simulating the falling of the avatar in the virtual environment further comprises updating the elevation of the avatar based on velocity and time associated with the fall.

15. A method of moving an avatar in a virtual world along an uneven terrain based on movement of a participant in a capture volume along a substantially level ground surface:
generating, by a computer, one or more rays in the virtual world that originate at a predetermined height above one or more portions of the avatar's body in the virtual environment and are directed vertically downwards towards the terrain of the virtual world;
intersecting the one or more rays with a collision mesh that defines the terrain of the virtual world at a location of the avatar to determine an offset in an elevation and an offset in an orientation of the avatar in the virtual environment with respect to the terrain of the virtual world in correlation to the movement of the participant in the capture volume,
wherein intersecting the one or more rays with the collision mesh to determine the offset in the elevation and the offset in the orientation of the avatar comprises:
determining a length of each of the one or more rays from a point of origin of a respective ray of the one or more rays to a point of intersection of the respective ray with the collision mesh that defines the terrain of the virtual world; and
determining the elevation of the avatar based on the lengths of the one or more rays;
adjusting, by the computer, the elevation and the orientation of the avatar in the virtual world to compensate for the determined offset in the elevation and the offset in the orientation and to align the avatar with the terrain of the virtual world; and
displaying, to the participant in the capture volume, a view of the virtual world from the adjusted elevation and the adjusted orientation of the avatar in the virtual world.

16. The method of claim 15, wherein the step of generating one or more rays from one or more portions of the avatar's body in the virtual environment comprises generating rays at one or more portions of each foot of the avatar in the virtual world.

17. The method of claim 15, wherein the step of generating one or more rays from one or more portions of the avatar's body in the virtual world comprises generating rays at a head, a waist, and feet of the avatar.

18. The method of claim 15, wherein adjusting the elevation and the orientation of the avatar in the virtual world comprises:
determining the elevation of the avatar based on the point of intersection of a ray generated at a left foot of the avatar with the collision mesh and the point of intersection of a ray generated at a right foot of the avatar with the collision mesh.

19. The method of claim 15, wherein adjusting the elevation and the orientation of the avatar in the virtual world comprises determining the elevation of the avatar based on the point of intersection of a ray generated at a waist of the avatar with the collision mesh.

20. The method of claim 15, wherein adjusting the elevation and the orientation of the avatar in the virtual world comprises determining the orientation of the avatar based on the point of intersection of a ray generated at a head portion of the avatar with the collision mesh and the point of intersection of a ray generated at a feet portion of the avatar with the collision mesh.

21. The method of claim 20, wherein the step of determining the orientation of the avatar comprises fitting a plane through points of intersections of at least two of the rays generated at the head portion, a waist, and the feet portion of the avatar with the collision mesh.

22. The method of claim 15, further comprising determining an action of the participant in the capture volume based on a position of the participant's head, the participant's left foot, and the participant's right foot in the capture volume.

23. The method of claim 22, further comprising: determining that the participant is jumping in the capture volume if a distance of both the left foot and the right foot of the participant are above a threshold distance in the capture volume.

24. The method of claim 23, further comprising: in response to determining that the participant is jumping in the capture volume, providing a one to one mapping of the participant in the motion capture volume to the avatar in the virtual world by disabling a determination of the elevation offset and the orientation offset.

25. The method of claim 22, further comprising: determining that the participant is in a prone position in the capture volume based on at least one of a vertical distance of the participant's head and the participant's waist from the substantially level ground surface of the capture volume and a distance of separation between the participant's head and the participant's waist in the capture volume.

26. A system, comprising:
a communication network; and
a computer coupled to the communication network and configured to:
determine an offset in an elevation and an offset in an orientation of an avatar in a virtual environment with respect to a terrain of the virtual environment in correlation to an elevation and an orientation of a person in a motion capture volume, wherein the avatar in the virtual environment is a virtual representation of the person in the capture volume;
adjust the elevation and the orientation of the avatar in the virtual environment to compensate for the offset in the elevation and the offset in the orientation of the avatar and to align the avatar with the terrain of the virtual environment;
display, to the person in the capture volume, a view of the virtual environment from the adjusted elevation and orientation of the avatar in the virtual environment;
disable the determination of the offset in the elevation and the offset in the orientation of the avatar when the person in the capture volume is performing a jumping motion; and
responsive to disabling the offset in the elevation and the offset in the orientation of the avatar, provide a one to one mapping of the person in the motion capture volume to the avatar in the virtual environment.

27. The system of claim 26, wherein the computer is configured to modify a transformation that maps the person from the capture volume to the virtual environment based on the offset in the elevation and the offset in the orientation of the avatar.

28. The system of claim 26, wherein to determine the offset in the elevation and the offset in the orientation of the avatar, the computer is configured to:
generate one or more rays in the virtual environment that originate at a predetermined height above one or more portions of the avatar's body in the virtual environment and are directed towards the terrain of the virtual environment;
intersect the one or more rays with a collision mesh that defines the terrain of the virtual environment; and
compute a point of intersection of each of the one or more rays with the collision mesh.

29. The system of claim 28, wherein the computer is configured to compute the offset in the elevation and the offset in the orientation of the avatar based on the points of intersection of the one or more rays with the collision mesh.

30. The system of claim 28, wherein the one or more rays are generated at each foot of avatar.

31. The system of claim 28, wherein the one or more rays are generated at a toe portion and a heel portion of each foot of the avatar.

32. The system of claim 28, wherein the one or more rays are generated at a head portion, a midriff portion, and a feet portion of the avatar.

33. The system of claim 26, wherein the computer is configured to adjust the elevation and the orientation of the avatar in the virtual environment by setting the elevation of the avatar as an average of a point of intersection of a ray generated at a left foot of the avatar with a collision mesh that defines the terrain of the virtual environment and a point of intersection of a ray generated at a right foot of the avatar with the collision mesh.

34. The system of claim 26, wherein the computer is configured to adjust the elevation and the orientation of the avatar in the virtual environment by setting the elevation of the avatar as one of a point of intersection of a ray from a right foot and a point of intersection of a ray from the left foot of the avatar with the collision mesh that defines the terrain of the virtual environment, wherein a selected point of intersection represents a higher elevation than the point of intersection that is not selected.

35. The system of claim 26, wherein the computer is configured to adjust the elevation and the orientation of the avatar in the virtual environment by setting the elevation of the avatar as a collision point of a ray generated from a midriff portion of the avatar with a collision mesh that defines the terrain of the virtual environment.

36. The system of claim 26, wherein the computer is configured to adjust the elevation and the orientation of the avatar in the virtual environment by setting the orientation of the avatar as an orientation of a plane that fits through a point of intersection of a ray generated at the head of the avatar with a collision mesh that defines the terrain of the virtual environment at a location of the avatar and a point of intersection of a ray generated at the feet of the avatar with the collision mesh.

37. The system of claim 26, wherein the computer is configured to simulate a falling of the avatar in the virtual environment based on a determination that a distance of right foot and left foot of the avatar from the terrain of the virtual environment is greater than a threshold falling distance.

* * * * *